US008504752B2

(12) United States Patent
Arinobu et al.

(10) Patent No.: US 8,504,752 B2
(45) Date of Patent: Aug. 6, 2013

(54) VIRTUAL MACHINE CONTROL DEVICE, VIRTUAL MACHINE CONTROL PROGRAM, AND VIRTUAL MACHINE CONTROL CIRCUIT FOR MANAGING INTERRUPTS OF PLURAL VIRTUAL MACHINES

(75) Inventors: Katsuhiro Arinobu, Kanagawa (JP); Tadao Tanikawa, Osaka (JP); Katsushige Amano, Kyoto (JP)

(73) Assignee: Panasonic Corporation, Osaka (JP)

( * ) Notice: Subject to any disclaimer, the term of this patent is extended or adjusted under 35 U.S.C. 154(b) by 320 days.

(21) Appl. No.: 12/997,704

(22) PCT Filed: Jun. 23, 2009

(86) PCT No.: PCT/JP2009/002847
§ 371 (c)(1),
(2), (4) Date: Dec. 13, 2010

(87) PCT Pub. No.: WO2009/157178
PCT Pub. Date: Dec. 30, 2009

(65) Prior Publication Data
US 2011/0106993 A1 May 5, 2011

(30) Foreign Application Priority Data
Jun. 24, 2008 (JP) .................. 2008-164079

(51) Int. Cl.
*G06F 13/24* (2006.01)
(52) U.S. Cl.
USPC ............................ 710/262; 710/264; 718/108
(58) Field of Classification Search
USPC .................. 710/260–269; 718/108
See application file for complete search history.

(56) References Cited

U.S. PATENT DOCUMENTS

| 4,975,836 | A | | 12/1990 | Hirosawa et al. | |
|---|---|---|---|---|---|
| 5,361,375 | A | * | 11/1994 | Ogi | 718/1 |
| 5,506,975 | A | * | 4/1996 | Onodera | 718/1 |
| 7,222,203 | B2 | * | 5/2007 | Madukkarumukumana et al. | 710/260 |
| 7,975,267 | B2 | * | 7/2011 | Bennett et al. | 718/1 |

(Continued)

FOREIGN PATENT DOCUMENTS
JP   56-42860    4/1981
JP   61-204743   9/1986
(Continued)

OTHER PUBLICATIONS

International Search Report issued Oct. 6, 2009 in International (PCT) Application No. PCT/JP2009/002847.

*Primary Examiner* — Nimesh G Patel
(74) *Attorney, Agent, or Firm* — Wenderoth, Lind & Ponack, L.L.P.

(57) ABSTRACT

The interrupt level storing unit (16) stores one or more interrupt levels indicating the priority of a generated interrupt and stores the interrupt level having the highest priority among the stored interrupt levels as a second interrupt mask level. The second interrupt type determination unit (13) sets an interrupt level corresponding to the interrupt type of a newly generated interrupt. The priority determination unit (14) notifies the interrupt to the virtual machine control unit (20) when the interrupt level of the newly generated interrupt is higher than the stored second interrupt mask level. As a result, the priority of the virtual machine can be determined according to the task priority and the switching of virtual machines can be adequately controlled even if the virtual machines cannot notify the task priority.

9 Claims, 19 Drawing Sheets

(56) References Cited

U.S. PATENT DOCUMENTS

| | | |
|---|---|---|
| 8,131,901 B2 * | 3/2012 | Mansell et al. ............... 710/260 |
| 2005/0149933 A1 | 7/2005 | Saito et al. |
| 2005/0228921 A1 * | 10/2005 | Sethi et al. .................... 710/268 |
| 2006/0036791 A1 * | 2/2006 | Jeyasingh et al. ............. 710/260 |

FOREIGN PATENT DOCUMENTS

| | | |
|---|---|---|
| JP | 8-190486 | 7/1996 |
| JP | 2000-242512 | 9/2000 |
| JP | 2002-149290 | 5/2002 |

\* cited by examiner

FIG.4

| INTERRUPT TYPE | INTERRUPT LEVEL |
|---|---|
| INTERRUPT NOTIFICATION FROM FIRST INTERRUPT CONTROLLER | 2 |
| INTERRUPT NOTIFICATION FROM IDLE DETECTION UNIT | 3 |
| INTERRUPT NOTIFICATION FROM SECOND INTERRUPT CONTROLLER | 5 |

HIGH PRIORITY ↑

| INTERRUPT TYPE | INTERRUPT LEVEL |
|---|---|
| INTERRUPT NOTIFICATION FROM FIRST INTERRUPT CONTROLLER | 2 |
| INTERRUPT NOTIFICATION FROM IDLE DETECTION UNIT | 3 |
| INTERRUPT NOTIFICATION FROM SECOND INTERRUPT CONTROLLER (NOTIFICATION LEVEL "4" TO "0") | 4 |
| INTERRUPT NOTIFICATION FROM SECOND INTERRUPT CONTROLLER (NOTIFICATION LEVEL "7" TO "5") | 6 |

HIGH PRIORITY

FIG.17

| INTERRUPT TYPE | INTERRUPT LEVEL |
|---|---|
| INTERRUPT NOTIFICATION FROM INTERRUPT NEGATE DETECTION UNIT | 1 |
| INTERRUPT NOTIFICATION FROM FIRST INTERRUPT CONTROLLER | 2 |
| INTERRUPT NOTIFICATION FROM IDLE DETECTION UNIT | 3 |
| INTERRUPT NOTIFICATION FROM SECOND INTERRUPT CONTROLLER | 5 |

↑ HIGH PRIORITY

VIRTUAL MACHINE CONTROL DEVICE, VIRTUAL MACHINE CONTROL PROGRAM, AND VIRTUAL MACHINE CONTROL CIRCUIT FOR MANAGING INTERRUPTS OF PLURAL VIRTUAL MACHINES

TECHNICAL FIELD

The present invention relates to virtual machine technology for operating a plurality of operating systems (abbreviated hereinbelow as OS) and OS applications on one CPU, and more particularly to a virtual machine control device that controls switching of a plurality of virtual machines.

BACKGROUND ART

Various kinds of processing are performed by information processing devices. For example, using a real-time OS (abbreviated hereinbelow as RTOS) is suitable for processing requiring real-time capability. Where an OS rich in graphic functions is used, an excellent user interface that makes the most of graphic functions can be provided. By using the virtual machine technology, it is possible to perform different kinds of processing simultaneously with the same device.

With the virtual machine technology, a plurality of OS is used simultaneously in one physical machine, and such technology has been used in servers or the like. Respective OS and OS applications become virtual machines, and a plurality of virtual machines is realized with time division on one physical machine.

With the conventional technique for controlling switching of virtual machines (virtual machine schedule), the priority of virtual machines is changed on the basis of the executed processing (see, for example, Patent Literature 1). With such conventional technique, the priority of the virtual machine executing a task is set by using the priority of the executed task, that is, the priority of the task that is used by OS in task management. When a task with a high priority is executed, the priority of the virtual machine also becomes high. Therefore, by switching to the virtual machine with a high priority, it is possible to execute a task with a high priority, regardless of the virtual machine to which the task belongs.

However, the problem associated with the conventional configuration is that the priority of the task that will be executed should be notified from the virtual machine, and in the case of a virtual machine that cannot notify the task priority, switching of virtual machines cannot be controlled.

CITATION LIST

Patent Literature

Patent Literature 1: Japanese Patent Application Publication No. 2000-242512.

SUMMARY OF INVENTION

The present invention has been created to resolve the aforementioned problems and it is an object of the present invention to provide a virtual machine control device, a virtual machine control program, and a virtual machine control circuit that can determine the priority of the virtual machine according to the task priority and control adequately the switching of virtual machines even if the virtual machines cannot notify the task priority.

The virtual machine control device according to one aspect of the present invention includes a virtual machine control unit that controls switching of a plurality of virtual machines operating on a CPU, and an interrupt control unit that controls notification of an interrupt to the virtual machine control unit on the basis of an interrupt level indicating a priority of the generated interrupt, wherein the virtual machine control unit includes a first interrupt type determination unit that determines a type of the interrupt notified from the interrupt control unit; an interrupt return destination storing unit that stores a program counter value immediately preceding the interrupt generation when the generated interrupt is determined to be an interrupt relating to a presently active virtual machine on the basis of the interrupt type determined by the first interrupt type determination unit; an interrupt mask level setting table that stores in advance as a first interrupt mask level a priority of an interrupt processing executed in each virtual machine and a priority of a task processing executed in each virtual machine; a first interrupt mask level setting unit that notifies to the interrupt control unit a first interrupt mask level corresponding to a next processing to be executed by the virtual machine from among the interrupt mask levels in the interrupt mask level setting table when the interrupt processing by the virtual machine has ended, and an update unit that requests the interrupt control unit to update an interrupt level in the interrupt control unit to the newest state, and the interrupt control unit includes an interrupt level storing unit that stores one or more interrupt levels indicating the priority of the generated interrupt and stores the interrupt level having the highest priority among the stored interrupt levels as a second interrupt mask level; a second interrupt mask level setting unit that sets in the interrupt level storing unit as an interrupt level the first interrupt mask level notified by the first interrupt mask level setting unit; a second interrupt type determination unit that receives the newly generated interrupt, determines a type of the newly generated interrupt, and sets in the interrupt level storing unit an interrupt level corresponding to the determined interrupt type, and a priority determination unit that compares the second interrupt mask level stored in the interrupt level storing unit with an interrupt level of the newly generated interrupt notified from the second interrupt type determination unit, and notifies an interrupt to the virtual machine control unit when the interrupt level of the newly generated interrupt is higher than the second interrupt mask level stored in the interrupt level storing unit.

With such a configuration, the virtual machine control unit controls switching of a plurality of virtual machines operating on a CPU, and the interrupt control unit controls notification of an interrupt to the virtual machine control unit on the basis of an interrupt level indicating a priority of the generated interrupt. A type of the interrupt notified from the interrupt control unit is determined and a program counter value immediately preceding the interrupt generation is stored when the generated interrupt is determined to be an interrupt relating to a presently active virtual machine on the basis of the determined interrupt type. The interrupt mask level setting table stores in advance a priority of an interrupt processing executed in each virtual machine and a priority of a task processing executed in each virtual machine as a first interrupt mask level. A first interrupt mask level corresponding to the next processing to be executed by the virtual machine from among the interrupt mask levels in the interrupt mask level setting table is notified to the interrupt control unit when the interrupt processing by the virtual machine has ended. The interrupt control unit is requested to update an interrupt level in the interrupt control unit to the newest state. The interrupt level storing unit stored one or more interrupt levels indicating the priority of the generated interrupt and stores the interrupt level with the highest priority among the stored interrupt levels as a second interrupt mask level. The notified first interrupt mask level is set as an interrupt level in the interrupt level storing unit. The newly generated interrupt is received, the type of the newly generated interrupt is determined, and an interrupt level corresponding to the determined interrupt type in the interrupt level storing unit is set. The second interrupt mask level stored in the interrupt level storing unit is compared with the interrupt level of the newly generated interrupt notified from the second interrupt type determination unit, and an interrupt to the virtual machine control unit is notified when the interrupt level of the newly generated interrupt is higher than the second interrupt mask level stored in the interrupt level storing unit.

In accordance with the present invention, by updating the priority for masking an interrupt in the interrupt control unit at a timing at which the interrupt processing of the virtual machine has ended, it is possible to determine the priority of the virtual machine according to the task priority and control adequately the switching of virtual machines even if the virtual machines cannot notify the task priority.

Objects, specific features, and advantages of the present invention will become more apparent from the following detailed description and appended drawings.

BRIEF DESCRIPTION OF DRAWINGS

FIG. 4 illustrates an example of setting contents of the second interrupt level setting unit of the integral interrupt controller in Embodiment 1 of the present invention.

FIG. 17 illustrates an example of setting contents of the second interrupt level setting unit of the integral interrupt controller in Embodiment 3 of the present invention.

DESCRIPTION OF EMBODIMENTS

The embodiments of the present invention will be described below with reference to the appended drawings. The below-described embodiments are specific examples of the present invention, but they place no limitation on the technical scope of the invention.

(Embodiment 1)

Figure 1:
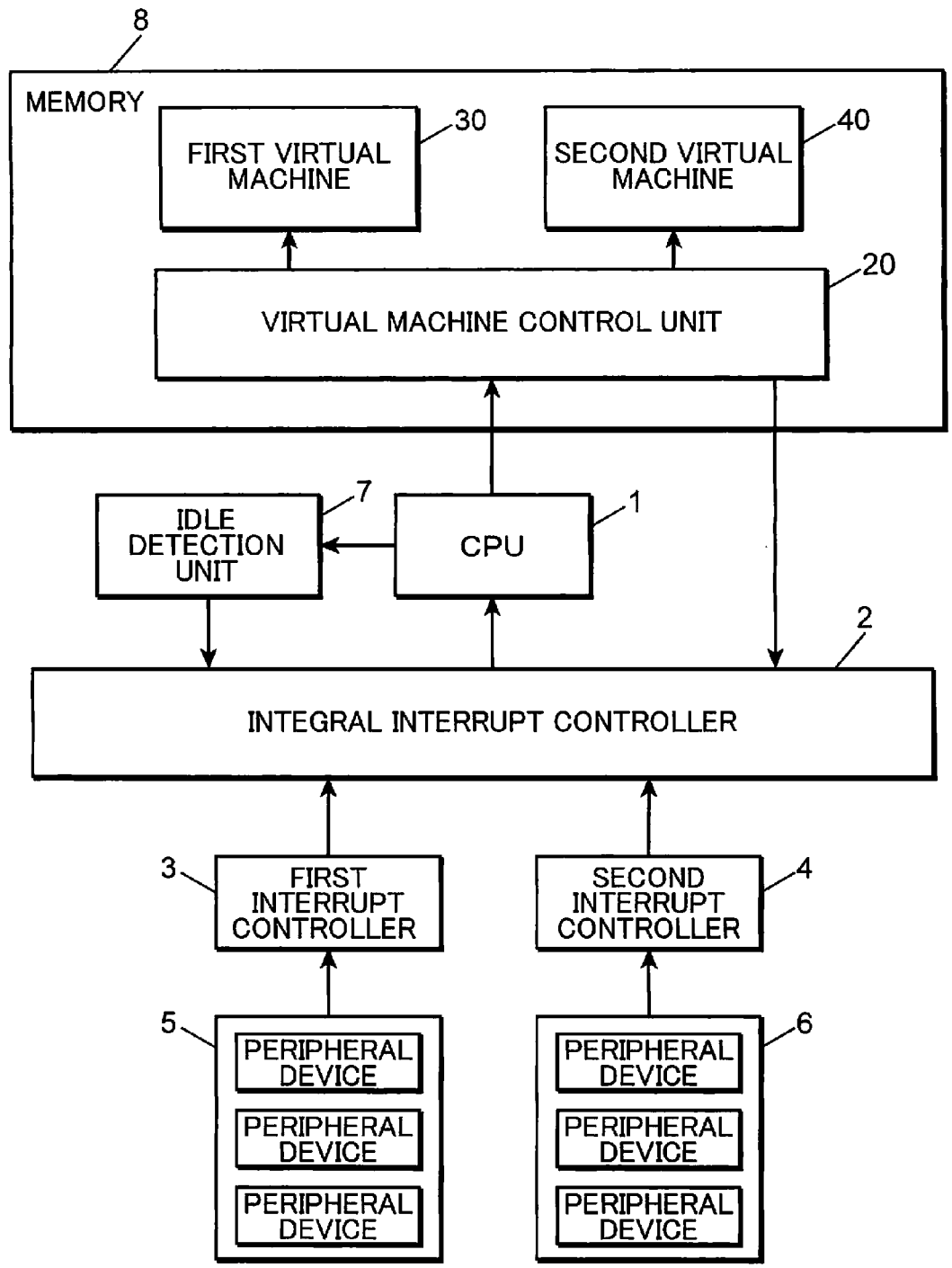
FIG. 1 is a block diagram illustrating a hardware configuration of the information processing device including the virtual machine control device in Embodiment 1 of the present invention.

FIG. 1 is a block-diagram illustrating a hardware configuration of an information processing device including the virtual machine control device in Embodiment 1 of the present invention.

The information processing device includes a central processing unit (CPU) 1, an integral interrupt controller 2, a first interrupt controller 3, a second interrupt controller 4, peripheral devices 5, peripheral devices 6, an idle detection unit 7, and a memory 8.

The CPU 1 can be any processing unit, provided it has sufficient processing capability. The integral interrupt controller 2 determines an interrupt request with the highest priority from among the interrupt requests notified from the first interrupt controller 3, the second interrupt controller 4, and the idle detection unit 7 and notifies the interrupt with the highest priority to the CPU 1.

The first interrupt controller 3 notifies an interrupt request generated from the peripheral devices 5 to the integral interrupt controller 2. Similarly to the first interrupt controller 3, the second interrupt controller 4 notifies an interrupt request generated from the peripheral devices 6 to the integral interrupt controller 2.

The peripheral devices 5, 6 are various input/output devices, and input/output devices corresponding to the utilization object of the information processing device are used. For example, the peripheral devices 5, 6 can include key devices, communication devices, display devices, decoders, encoders, DSP (Digital Signal Processors), and DMA (Direct Memory Access) controllers.

The peripheral device 5 generates an interrupt that will be processed in the first virtual machine 30, and the peripheral device 6 generates an interrupt that will be processed in the second virtual machine 40. The first interrupt controller 3 outputs an interrupt request to the first virtual machine 30, and the second interrupt controller 4 outputs an interrupt request to the second virtual machine 40.

The idle detection unit 7 detects that the CPU 1 executes a command to implement a transition to an idle state (power saving mode) and outputs an interrupt request to a second interrupt type determination unit 13. Thus, when the CPU 1 executes a command to implement a transition to an idle state, the idle detection unit 7 detects a signal outputted from the CPU 1 and notifies an interrupt request to the integral interrupt controller 2.

The memory 8 stores a program that causes the CPU 1 to function as a virtual machine control unit 20, the first virtual machine 30, and the second virtual machine 40. The memory 8 is not required to be constituted by a single memory device and may be a combination of a plurality of memory devices of the same type or dissimilar memory devices including read only memory (ROM). Further, an external memory device, for example such as a hard disk drive, may be provided in addition to the memory 8, and the contents of the memory 8 may be transferred to the external memory device to the extent such that the operation of the information processing device is not inhibited.

Figure 2:
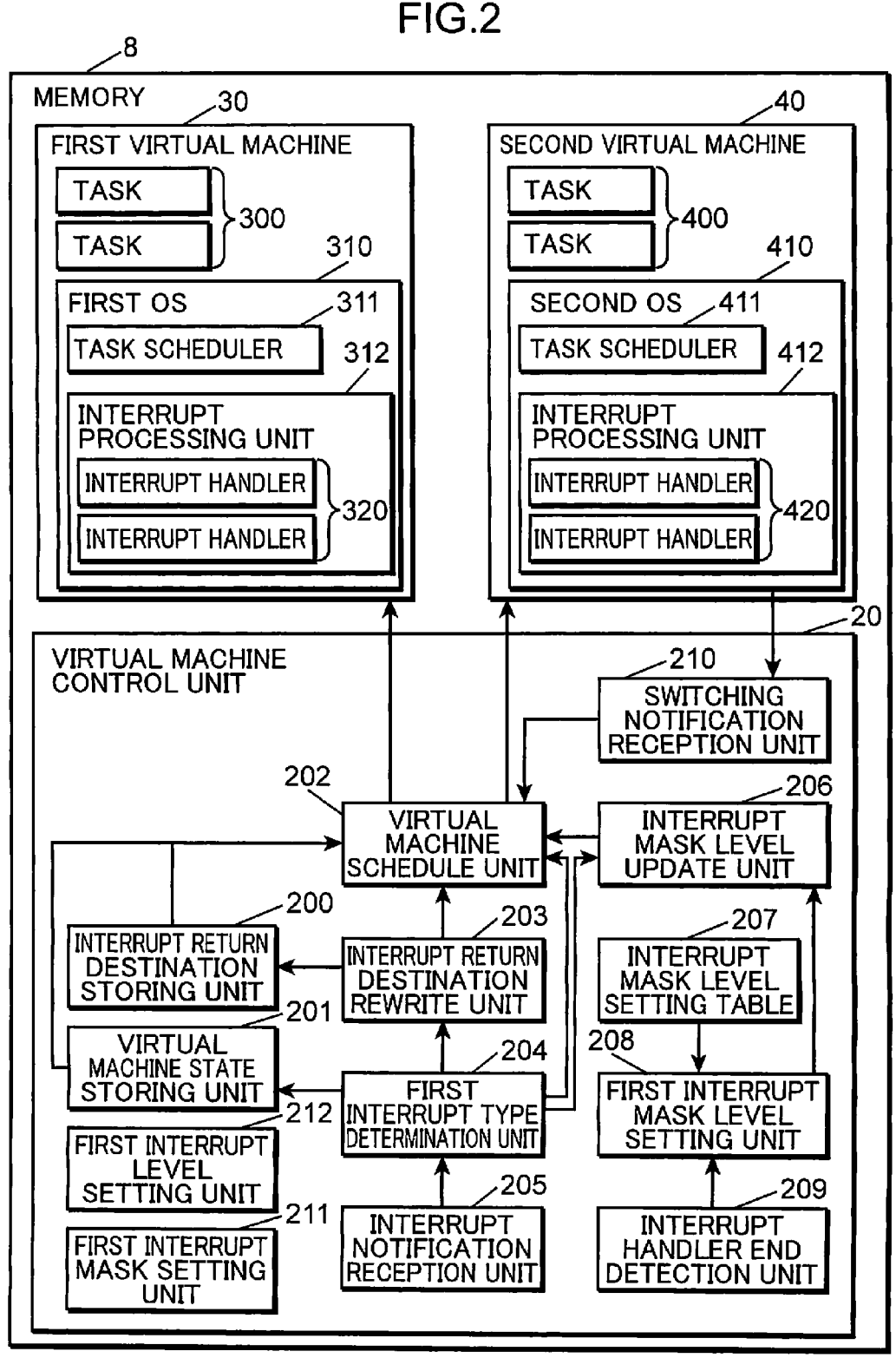
FIG. 2 is a block diagram illustrating a detailed configuration of the memory of the information processing device in Embodiment 1 of the present invention.

FIG. 2 is a block diagram illustrating a detailed configuration of the memory 8 of the information processing device in Embodiment 1 of the present invention. The memory 8 stores a program that causes the CPU 1 to function as the first virtual machine 30, the second virtual machine 40, and virtual machine control unit 20.

The first virtual machine 30 is provided with a plurality of tasks 300 and a first OS 310. Further, the first OS 310 includes a task scheduler 311 and an interrupt processing unit 312.

The task scheduler 311 determines the task that is next to be executed and executes the determined task. The interrupt processing unit 312 includes a plurality of interrupt handlers 320, and when an interrupt generation notification is received, the interrupt processing unit executes the interrupt handler 320 corresponding to the cause of the interrupt. The first virtual machine 30 will be explained below as a virtual machine in which software cannot be modified.

Similarly to the first virtual machine 30, the second virtual machine 40 is provided with a plurality of tasks 400 and a second OS 410. Further, the second OS 410 includes a task scheduler 411 and an interrupt processing unit 412.

The task scheduler 411 determines the task that is next to be executed and executes the determined task. The interrupt processing unit 412 includes a plurality of interrupt handlers 420, and when an interrupt generation received is received, the interrupt processing unit executes the interrupt handler 420 corresponding to the cause of the interrupt.

The operation of the task scheduler 411 and the interrupt processing unit 412 is similar to that of the task scheduler 311 and the interrupt processing unit 312 included in the first virtual machine 30.

A priority has been set for each task 300, 400 or interrupt handler 320, 420.

The information processing device according to Embodiment 1 of the present invention includes a plurality of virtual machines (first virtual machine 30 and second virtual machine 40), and each virtual machine (first virtual machine 30 and second virtual machine 40) includes mutually different OS (first OS 310 and second OS 410), tasks 300, 400, and interrupt handlers 320, 420.

The first virtual machine 30 and the second virtual machine 40 are switched by the below-described virtual machine control unit 20. The plurality of virtual machines (first virtual machine 30 and second virtual machine 40) are operated in a time division mode, rather than simultaneously. As a result, a plurality of machines can be caused to operate on one physical machine. For example, a processing that requires real time capabilities is implemented as the task 300 or interrupt handler 320 of the first virtual machine 30, and a RTOS with excellent real time capabilities is used for the first OS 310. A processing relating to a user interface is implemented as the task 400 or the interrupt handler 420 of the second virtual machine 40, and an OS rich in graphic functions is used for the second OS 410.

With such a configuration, the information processing device in Embodiment 1 can realize simultaneously the control of the transmission system that requires a real time capability and excellent user interface control that uses rich graphic functions.

The first OS 310 and the second OS 410 are not necessary mutually different OS. Thus, the first OS 310 and the second OS 410 may be configured as the same OS.

The virtual machine control unit 20 controls switching of a plurality of virtual machines operating on the CPU 1. The virtual machine control unit 20 includes an interrupt return destination storing unit 200, a virtual machine state storing unit 201, a virtual machine schedule unit 202, an interrupt return destination rewrite unit 203, a first interrupt type determination unit 204, an interrupt notification reception unit 205, an interrupt mask level update unit 206, an interrupt mask level setting table 207, a first interrupt mask level setting unit 208, an interrupt handler end detection unit 209, a switching notification reception unit 210, a first interrupt mask setting unit 211, and a first interrupt level setting unit 212.

The interrupt notification reception unit 205 receives an interrupt generation notification from the integral interrupt controller 2 via the CPU 1 when an interrupt is generated. Further, the interrupt notification reception unit 205 notifies the interrupt information indicating that the interrupt has been generated to the first interrupt type determination unit 204.

The first interrupt type determination unit 204 determines the type of the interrupt notified from the integral interrupt controller 2. The first interrupt type determination unit 204 requests the interrupt type corresponding to the interrupt notified from the interrupt notification reception unit 205 to the second interrupt type determination unit 13 in the below-described integral interrupt controller 2 and acquires the interrupt type from the second interrupt type determination unit 13.

Then, the first interrupt type determination unit 204 sets the operation state of the virtual machine (first virtual machine 30 and second virtual machine 40) in the virtual machine state storing unit 201 in response to the interrupt type acquired from the second interrupt type determination unit 13. The operation state of the virtual machine includes an execution state indicating that the virtual machine executes a processing, an idle state indicating that the virtual machine has implemented a transition to a power saving mode, and a suspend state indicating that the virtual machine has temporarily suspended the operation.

When there is an interrupt that has been sent from the first interrupt controller 3 or the second interrupt controller 4, the first interrupt type determination unit 204 sets the operation state of the virtual machine that will execute this interrupt to the execution state and sets the virtual machine that was in the execution state to the suspend state. Further, when there is an interrupt notification that has been sent from the idle detection unit 7, the first interrupt type determination unit 204 sets the operation state of the corresponding virtual machine to the idle state. When there is an interrupt that has been sent from the first interrupt controller 3 or the second interrupt controller 4, the first interrupt type determination unit 204 notifies the interrupt information indicating that the interrupt has been generated to the interrupt return destination rewrite unit 203, and when there is an interrupt sent from the idle detection unit 7, the first interrupt type determination unit 204 notifies the interrupt information indicating that the interrupt has been generated to the interrupt mask level update unit 206.

The interrupt notifications include an interrupt notification seeking a reset request. A watchdog timer issues an interrupt notification seeking a reset request when the virtual machine has assumed a freeze state. When the interrupt notification is received from the watchdog timer, the CPU 1 executes an infinite loop in a state in which an interrupt is prohibited at the very end of the interrupt handler processing and waits for a hardware restart. When the reset processing such as described above is executed, the processing runs into an infinite loop in a state in which an interrupt is prohibited. The resultant problem is that the interrupt processing to another virtual machine cannot be executed and the system becomes inoperative.

Accordingly, for example, when the generated interrupt is an interrupt created by a watchdog timer relating to the first virtual machine 30, the first interrupt type determination unit 204 may cancel a privilege mode that has been set in the first virtual machine 30. By canceling the privilege mode of the first virtual machine 30, it is possible to prevent an operation that prohibits the CPU interrupt by the first virtual machine 30 and resolve the above-described problem.

The virtual machine state storing unit 201 saves the operation state of the virtual machine (first virtual machine 30 and second virtual machine 40) that is set by the aforementioned first interrupt type determination unit 204.

The interrupt return destination rewrite unit 203 saves the interrupt return destination address designated by the notified interrupt in the interrupt return destination storing unit 200 and rewrites the interrupt return destination address to an address of the interrupt handler end detection unit 209.

Where the interrupt information is notified from the first interrupt type determination unit 204, the interrupt return destination rewrite unit 203 saves the interrupt return destination address designated by the notified interrupt in the interrupt return destination storing unit 200. The interrupt return destination rewrite unit 203 saves the interrupt return destination address representing the return processing when the interrupt processing has ended in the interrupt return destination storing unit 200.

Then, the interrupt return destination rewrite unit 203 rewrites the interrupt return destination address contained in the notified interrupt information to an address of the interrupt handler end detection unit 209 in the virtual machine control unit 20 and notifies the interrupt information to the virtual machine schedule unit 202. As a result, the completion of the interrupt handler processing of the virtual machine (first virtual machine 30 and second virtual machine 40) can be detected by the virtual machine control unit 20.

The interrupt return destination storing unit 200 saves the interrupt return destination address saved by the interrupt return destination rewrite unit 203. The interrupt return destination address saved by the interrupt return destination storing unit 200 becomes a program counter value of the virtual machine (first virtual machine 30 and second virtual machine 40) that was active when the interrupt was generated. When the generated interrupt is determined to be an interrupt relating to a presently active virtual machine on the basis of the interrupt type determined by the first interrupt type determination unit 204, the interrupt return destination storing unit 200 saves the program counter value immediately preceding the interrupt generation.

The interrupt mask level update unit 206 requests that the integral interrupt controller 2 update the interrupt level in the integral interrupt controller 2 to the newest state. In the present embodiment, the interrupt mask level update unit 206 corresponds to an example of an update unit.

The interrupt mask level update unit 206 requests that the interrupt level storing unit 16 in the below described integral interrupt controller 2 update the interrupt mask level, updates the interrupt mask level that has been saved in the interrupt level storing unit 16 to the newest state, and notifies to the virtual machine schedule unit 202 that the interrupt mask level has been updated. Where the interrupt cause relating to the first interrupt controller 3 and the second interrupt controller 4 has been cleared, the interrupt level that has been saved in the interrupt level storing unit 16 is cleared at this point in time.

The interrupt handler end detection unit 209 detects that the interrupt processing by the interrupt handler has ended by execution and notifies to the first interrupt mask level setting unit 208 that the processing by the interrupt handler has ended. In other words, because the interrupt return destination rewrite unit 203 rewrites the interrupt return destination address to the address of the interrupt handler end detection unit 209, where the processing by the interrupt handler ends, the processing returns to the interrupt handler end detection unit 209. In the present embodiment, the interrupt handler end detection unit 209 corresponds to an example of an interrupt end detection unit.

The interrupt mask level setting table 207 is a table having saved therein the set values of the interrupt mask levels during task (task 300 and task 400) execution by the virtual machine (first virtual machine 30 and second virtual machine 40). The priority of interrupt processing executed in each virtual machine and the priority of task processing executed in each virtual machine are stored in advance as an interrupt mask level (first interrupt mask level) in the interrupt mask level setting table 207. An interrupt with a priority higher than the interrupt mask level is executed, and an interrupt with a priority lower than the interrupt mask level is not executed. The interrupt mask level is a value set by the virtual machine control unit 20 when the system is started and is a fixed value that is not changed when the system operates.

The first interrupt mask level setting unit 208 receives an interrupt handler end notification from the interrupt handler end detection unit 209 and performs processing. The first interrupt mask level setting unit 208 sets the interrupt mask level that has been set in the interrupt mask level setting table 207 in the second interrupt mask level setting unit 15 in the integral interrupt controller 2. The first interrupt mask level setting unit 208 notifies to the interrupt mask level update unit 206 that the interrupt mask level has been set.

Further, the first interrupt mask level setting unit 208 acquires from the interrupt mask level setting table 207 the interrupt mask level of the task processing of the next virtual machine to execute the processing. For example, when the interrupt handler processing towards the first virtual machine 30 is ended, the interrupt mask level of the task of the first virtual machine 30 will be set.

Thus, the first interrupt mask level setting unit 208 will notify to the integral interrupt controller 2 the interrupt mask level corresponding to the next processing to be executed by the virtual machine, from among the interrupt mask levels in the interrupt mask level setting table 207, when the interrupt processing performed by the interrupt handler has ended.

The switching notification reception unit 210 receives from the second virtual machine 40 a switching notification that switches the processing that is being executed and notifies the end of the processing by the interrupt handler to the virtual machine schedule unit 202.

The virtual machine schedule unit 202 performs switching control of the virtual machine on the basis of an invoker, an interrupt type, and an operation state of the virtual machine. More specifically, when invoked from the interrupt return destination rewrite unit 203, the virtual machine schedule unit 202 determines that there is an interrupt request to the first virtual machine 30 and invokes the interrupt processing unit 312.

Further, when invoked from the interrupt mask level update unit 206, the virtual machine schedule unit 202 causes a transition to the interrupt return destination address that has been saved in the interrupt return destination storing unit 200 if the interrupt type is other than that in the interrupt notification from the idle detection unit 7. Where an interrupt notification from the idle detection unit 7 is present, the virtual machine schedule unit 202 verifies the operation state of the virtual machine saved in the virtual machine state storing unit 201. Where both the first virtual machine 30 and the second virtual machine 40 are in the idle state, the virtual machine schedule unit 202 causes the entire system to implement a transition to the power saving mode. Where a virtual machine in a suspend state is present among the first virtual machine 30 and the second virtual machine 40, the virtual machine schedule unit 202 invokes the task scheduler 411 of the virtual machine in the suspend state.

Further, when invoked from the switching notification reception unit 210, the virtual machine schedule unit 202 determines that the interrupt processing of the second virtual machine 40 has ended and causes a transition of processing to the task scheduler 411 of the second virtual machine 40 on the basis of the priority of the interrupt mask level setting table 207.

The first interrupt mask setting unit 211 sends an interrupt mask setting request for setting an interrupt mask to be used in the integral interrupt controller 2 to the second interrupt mask setting unit 11 in the below-described integral interrupt controller 2 and sets the interrupt mask that will be used in the integral interrupt controller 2. As a result, the integral interrupt controller 2 can mask the unnecessary interrupt.

The first interrupt level setting unit 212 sends an interrupt level setting request for setting an interrupt level corresponding to each interrupt type to the second interrupt level setting unit 12 in the below-described integral interrupt controller 2 and sets the interrupt level corresponding to each interrupt type. The first interrupt level setting unit 212 performs the processing when the system is started. As a result, when an interrupt is generated, the processing corresponding to the interrupt level of the interrupt type can be performed.

Figure 3:
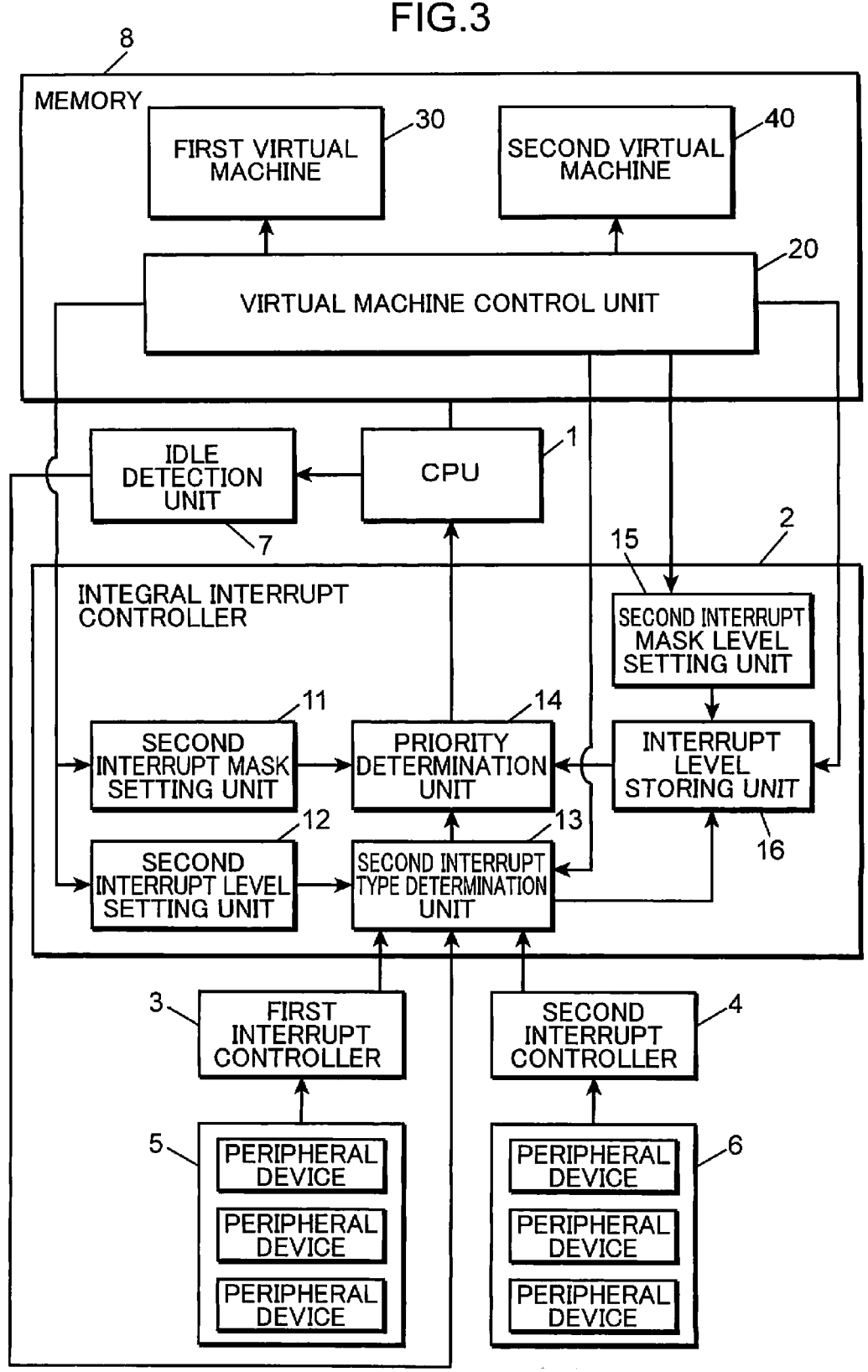
FIG. 3 is a block diagram illustrating a detailed configuration of the integral interrupt controller of the information processing device in Embodiment 1 of the present invention.

FIG. 3 is a block diagram illustrating a detailed configuration of the integral interrupt controller 2 of the information processing device in Embodiment 1 of the present invention. The detailed configuration of the integral interrupt controller 2 will be explained with reference to FIG. 3.

The integral interrupt controller 2 controls the notification of interrupts to the virtual machine control unit 20 on the basis of the interrupt level indicating the priority of the generated interrupt. The integral interrupt controller 2 includes a second interrupt mask setting unit 11, a second interrupt level setting unit 12, a second interrupt type determination unit 13, a priority determination unit 14, a second interrupt mask level setting unit 15, and an interrupt level storing unit 16. In the present embodiment, the integral interrupt controller 2 corresponds to an example of an interrupt control unit.

The second interrupt mask setting unit 11 is a register for setting whether or not to notify interrupt requests from the first interrupt controller 3, the second interrupt controller 4, and the idle detection unit 7 to the CPU 1. The second interrupt mask setting unit 11 receives an interrupt mask setting request from the first interrupt mask setting unit 211 of the virtual machine control unit 20 and saves the interrupt mask setting based on the interrupt mask setting request.

The second interrupt mask setting unit 11 receives a request from the virtual machine schedule unit 202 of the virtual machine control unit 20 and sets the priority determination unit 14 so as to mask the interrupt on the basis of the request. The second interrupt mask setting unit 11 sets the priority determination unit 14 so as to mask the generated interrupt request in order not to notify an interrupt request to the virtual machine control unit 20.

The second interrupt mask setting unit 11 sets the priority determination unit 14 so as to mask an interrupt request from the idle detection unit 7 and causes the entire system to implement a transition to the power saving mode when the operation state of all of the virtual machines is the idle state.

The second interrupt level setting unit 12 is a register that sets a level (priority) for each interrupt request in order to discriminate between the interrupt requests from the first interrupt controller 3, the second interrupt controller 4, and the idle detection unit 7. The second interrupt level setting unit 12 receives an interrupt level setting request from the first interrupt level setting unit 212 of the virtual machine control unit 20 and saves the setting of the interrupt level based on the interrupt level setting request. The second interrupt level setting unit 12 saves the interrupt level corresponding to the interrupt type.

The second interrupt type determination unit 13 receives a newly generated interrupt, determines the type of the newly generated interrupt, and sets the interrupt level corresponding to the determined interrupt type in the interrupt level storing unit 16.

The second interrupt type determination unit 13 saves the notified interrupt request as interrupt request information, determines from where the interrupt request has been notified, and notifies to the interrupt level storing unit 16 the interrupt level that has been set in the second interrupt level setting unit 12 and corresponds to the interrupt request. Further, the second interrupt type determination unit 13 notifies to the priority determination unit 14 that the interrupt request has been received. In this case, the second interrupt type determination unit 13 notifies the interrupt level corresponding to the interrupt request to the priority determination unit 14. Furthermore, the second interrupt type determination unit 13 receives a request for the interrupt type from the first interrupt type determination unit 204 of the virtual machine control unit 20 and returns the newest interrupt request information including the interrupt type to the first interrupt type determination unit 204.

The priority determination unit 14 compares the interrupt levels of the interrupt mask level (second interrupt mask level) that has been saved in the interrupt level storing unit 16 and the newly generated interrupt notified from the second interrupt type determination unit 13 and, when the interrupt level of the newly generated interrupt is higher that the interrupt mask level saved in the interrupt level storing unit 16, notifies the interrupt to the virtual machine control unit 20.

The priority determination unit 14 acquires the present interrupt mask level from the interrupt level storing unit 16 and compares the acquired interrupt mask level with the interrupt level notified from the second interrupt type determination unit 13. When the interrupt level has a priority higher than the interrupt mask level, the priority determination unit 14 notifies an interrupt request to the CPU 1. However, when an interrupt notification is set ineffectively in the second interrupt mask setting unit 11, the priority determination unit 14 does not notify an interrupt request to the CPU 1. Where the interrupt request from the priority determination unit 14 is inputted, the CPU 1 sends an interrupt generation notification to the interrupt notification reception unit 205 of the virtual machine control unit 20.

The second interrupt mask level setting unit 15 notifies an interrupt mask level that has been set by software control from the interrupt mask level update unit 206 of the virtual machine control unit 20 to the interrupt level storing unit 16. The second interrupt mask level setting unit 15 sets the interrupt mask level notified by the first interrupt mask level setting unit 208 as an interrupt level in the interrupt level storing unit 16.

The interrupt level storing unit 16 saves the interrupt level notified from the second interrupt type determination unit 13 and the interrupt mask level notified from the second interrupt mask level setting unit 15. Further, the interrupt level storing unit 16 is a register that saves the interrupt mask level with the highest priority among the saved interrupt mask levels as the present interrupt mask level. The saved interrupt mask level is stored till it is cleared by the virtual machine control unit 20. The interrupt mask level that has been set in the interrupt level storing unit 16 is updated to the newest state by a request from the first interrupt mask level setting unit 208 of the virtual machine control unit 20.

Thus, the interrupt level storing unit 16 saves one or more interrupt levels indicating the priority of the generated interrupt and saves as an interrupt mask level (second interrupt mask level) the interrupt level with the highest priority from among the saved interrupt levels.

Further, the interrupt level storing unit 16 saves the interrupt level of the interrupt received by the second interrupt type determination unit 13 as an interrupt level corresponding to the type of the interrupt that has been stored in advance in the second interrupt level setting unit 12 and also saves the interrupt mask level notified from the first interrupt mask level setting unit 208 to the second interrupt mask level setting unit 15 as an interrupt level.

The priority determination unit 14 does not notify to the virtual machine control unit 20 an interrupt with an interrupt level below that with the highest priority from among the interrupt levels saved in the interrupt level storing unit 16.

With the above-described configuration, the end of the interrupt handler processing and task processing in a virtual machine can be detected by the virtual machine control unit 20, and the interrupt mask level of the integral interrupt controller 2 can be controlled at a timing at which the interrupt handler processing and task processing has ended. As a result, the priority of the virtual machine can be determined according to the task priority and a schedule of the appropriate virtual machine can be controlled even if the virtual machines cannot notify the task priority.

FIG. 4 illustrates an example of setting contents of the second interrupt level setting unit 12 of the integral interrupt controller 2 in Embodiment 1 of the present invention. The second interrupt level setting unit 12 sets an interrupt level for each hardware (interrupt type) that will notify an interrupt. The interrupt level represents a priority. In FIG. 4, the interrupt type includes an interrupt notification from the first interrupt controller 3, an interrupt notification from the second interrupt controller 4, and an interrupt notification from the idle detection unit 7, and respective interrupt levels of "2", "5", and "3" are set. In the explanation below, the interrupt level is divided into 8 stages: "0" to "7", and the smaller numerical value corresponds to a higher priority. With the above-described configuration, the integral interrupt controller 2 in Embodiment 1 of the present invention can determine the priority order of each interrupt.

Figure 5:
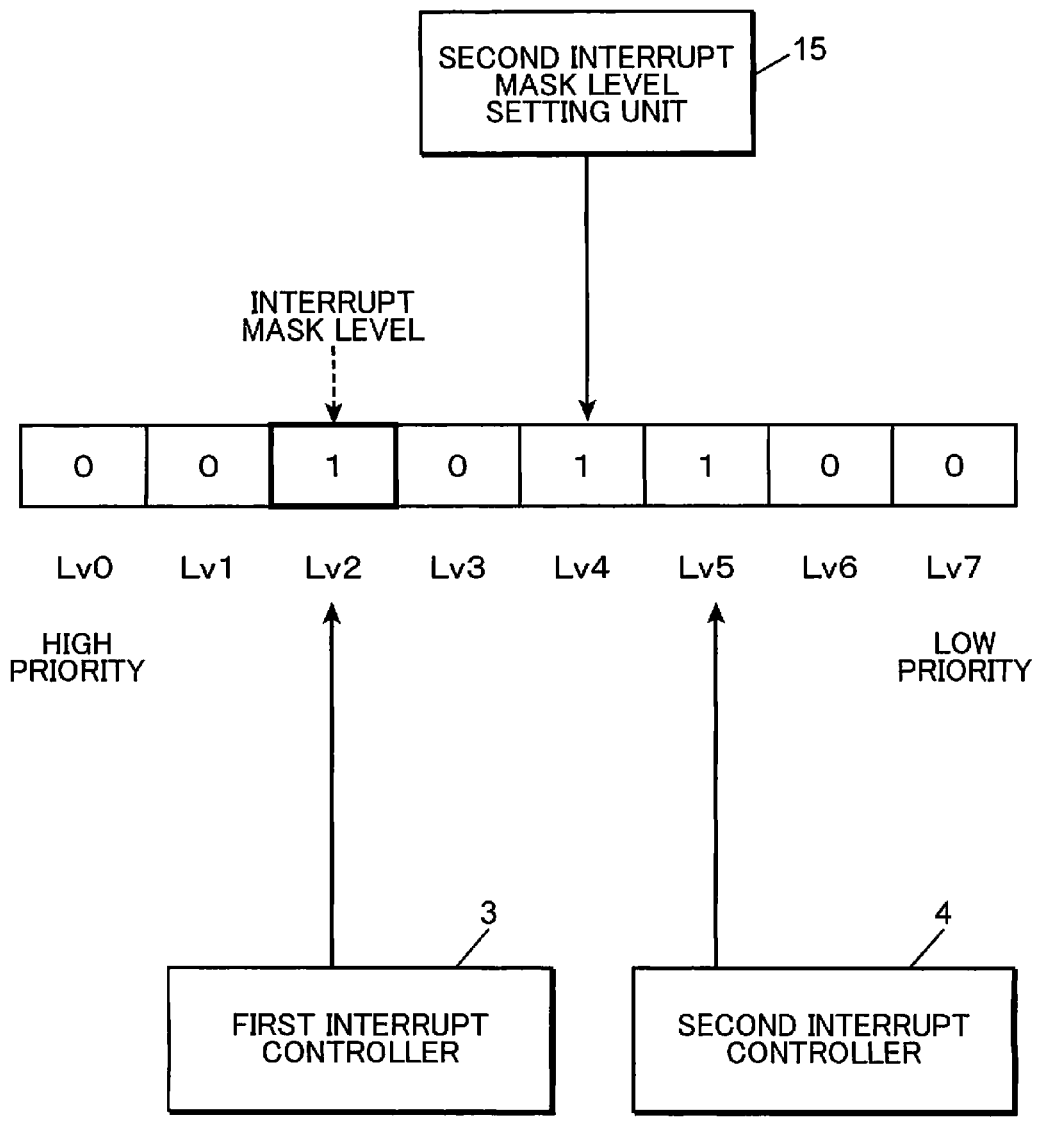
FIG. 5 shows an example of storage contents of the interrupt level storing unit of the integral interrupt controller in Embodiment 1 of the present invention.

FIG. 5 shows an example of storage contents of the interrupt level storing unit 16 of the integral interrupt controller 2 in Embodiment 1 of the present invention. In this case the interrupt level is divided into 8 stages: "0" to "7". The interrupt level storing unit 16 saves the interrupt level caused by hardware interrupt that has been received in the integral interrupt controller 2 and the interrupt level that has been set by software control from the virtual machine control unit 20. In the interrupt level storing unit 16, a bit corresponding to the received interrupt level is set to 1. The interrupt level with the smallest numerical value from among the received interrupt levels is set as an interrupt mask level of the integral interrupt controller 2. The integral interrupt controller 2 can determine by means of software the priority order of the interrupt processing and task processing of the virtual machine by using information stored in the interrupt level storing unit 16.

Figure 6:
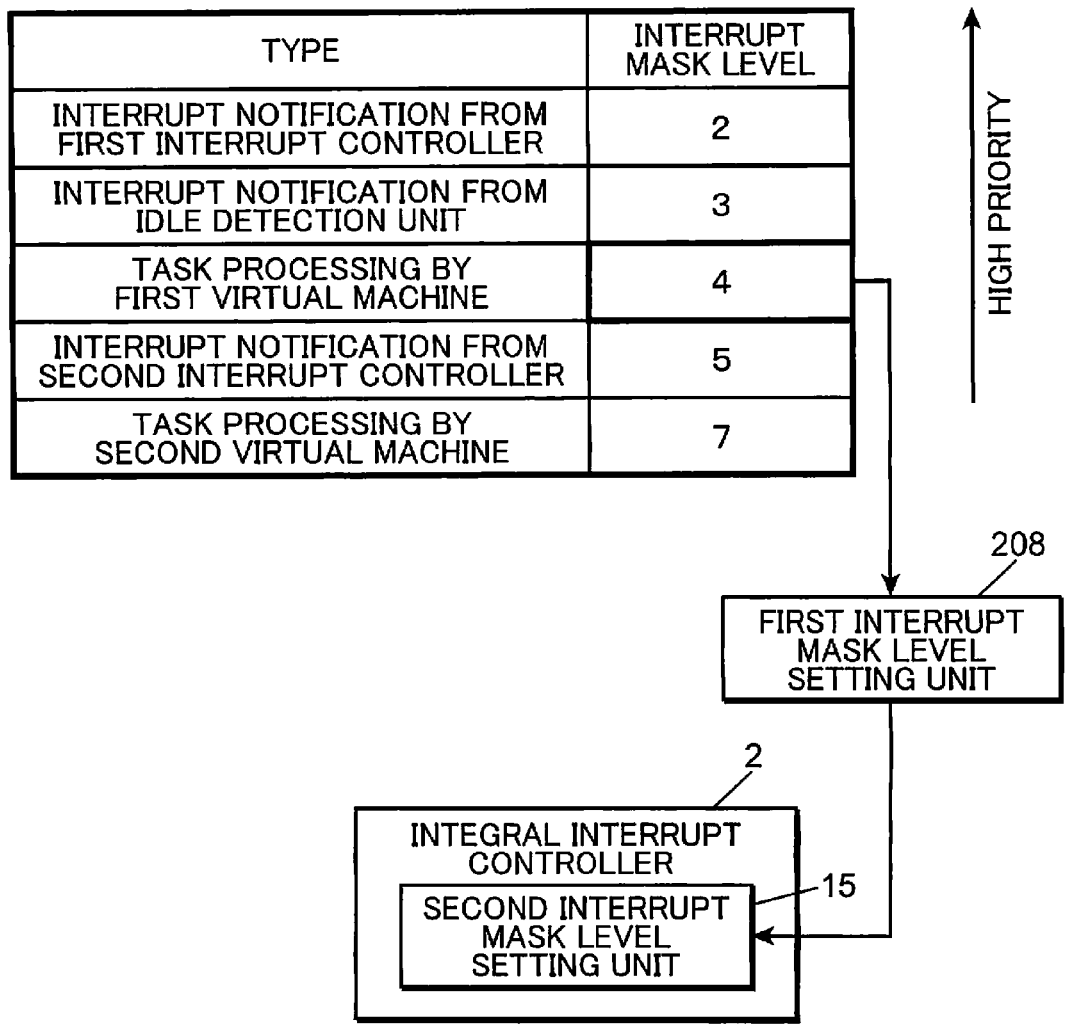
FIG. 6 shows an example of setting contents of the interrupt mask level setting table of the virtual machine control unit in Embodiment 1 of the present invention.

FIG. 6 shows an example of setting contents of the interrupt mask level setting table 207 of the virtual machine control unit 20 in Embodiment 1 of the present invention. The type that is an object of setting an interrupt mask level and the interrupt mask level that will be set for each type are saved in the interrupt mask level setting table 207. At the time of interrupt handler end, the first interrupt mask level setting unit 208 sets the interrupt mask level that has been set in the interrupt mask level setting table 207 in the second interrupt mask level setting unit 15.

The operation of the information processing device in the case in which an interrupt from the first interrupt controller 3 has been generated during task processing execution in the first virtual machine 30 will be explained below. FIGS. 7, 8, 9, and 10 are flowcharts illustrating examples of operation performed by the information processing device in the case in which an interrupt from the first interrupt controller 3 has been generated during task processing execution in the first virtual machine 30.

Figure 7:
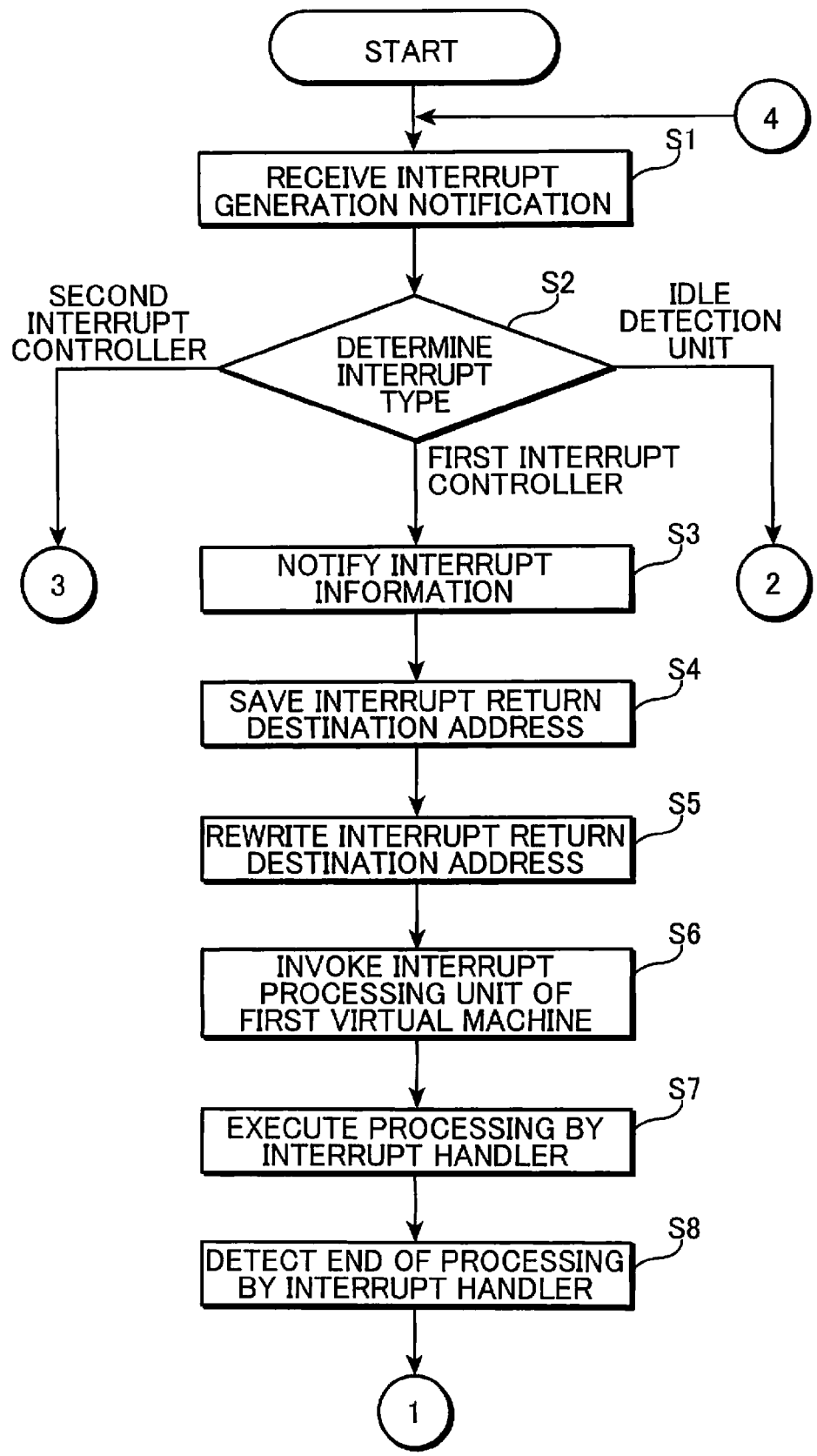
FIG. 7 is a flowchart illustrating an example of operation from the interrupt generation in the first interrupt controller to the end of interrupt handler processing performed by the interrupt processing unit in Embodiment 1 of the present invention.

First, the operation from the interrupt generation in the first interrupt controller 3 to the end of interrupt handler processing performed by the interrupt processing unit 312 will be explained. FIG. 7 is a flowchart illustrating the operation from the interrupt generation in the first interrupt controller 3 to the end of interrupt handler processing performed by the interrupt processing unit 312 in Embodiment 1 of the present invention.

When an interrupt from the first interrupt controller 3 is generated during task processing execution in the first virtual machine 30, the virtual machine control unit 20 starts the processing. Where an interrupt is generated, the interrupt notification reception unit 205 receives an interrupt generation notification outputted from the CPU 1 (step S1). For example, when the CPU 1 receives an interrupt request outputted from the integral interrupt controller 2 and detects the interrupt, an interrupt vector that is the destination of processing jump is set in the virtual machine control unit 20. As a result, the interrupt notification reception unit 205 can be actuated during interrupt generation.

The interrupt notification reception unit 205 notifies the interrupt information indicating that the interrupt has been generated to the first interrupt type determination unit 204. The first interrupt type determination unit 204 then determines the interrupt type of the generated interrupt (step S2). The first interrupt type determination unit 204 acquires the interrupt type that is the object of determination from the second interrupt type determination unit 13 of the integral interrupt controller 2.

When the interrupt is determined to be from the first interrupt controller 3 as a result of the interrupt type determination ("first interrupt controller" in step S2), the first interrupt type determination unit 204 notifies the interrupt information indicating that the interrupt has been generated to the interrupt return destination rewrite unit 203 (step S3).

The interrupt return destination rewrite unit 203 then saves the interrupt return destination address designated by the notified interrupt information to the interrupt return destination storing unit 200 (step S4). The interrupt return destination rewrite unit 203 then rewrites the interrupt return destination address contained in the notified interrupt information to the address inside the virtual machine control unit 20 (step S5). The interrupt return destination rewrite unit 203 invokes the virtual machine schedule unit 202. The address inside the virtual machine control unit 20 that is rewritten, as referred to hereinabove, is an address of the interrupt handler end detection unit 209. The case in which the interrupt is determined to be from the idle detection unit 7 as a result of the interrupt type determination will be described below with reference to FIG. 9, and the case in which the interrupt is determined to be from the first interrupt controller 3 will be described below with reference to FIG. 10.

Since the invocation was received from the interrupt return destination rewrite unit 203, the virtual machine schedule unit 202 determines that the interrupt request is to the first virtual machine 30 and invokes the interrupt processing unit 312 of the first virtual machine 30 (step S6).

The interrupt processing unit 312 then executes the processing performed by the interrupt handler 320 corresponding to the generated interrupt (step S7).

After the processing by the interrupt handler has ended, the interrupt handler end detection unit 209 detects the end of the processing by the interrupt handler (step S8). Further, the interrupt handler end detection unit 209 notifies to the first interrupt mask level setting unit 208 that the processing by the interrupt handler has ended.

Figure 8:
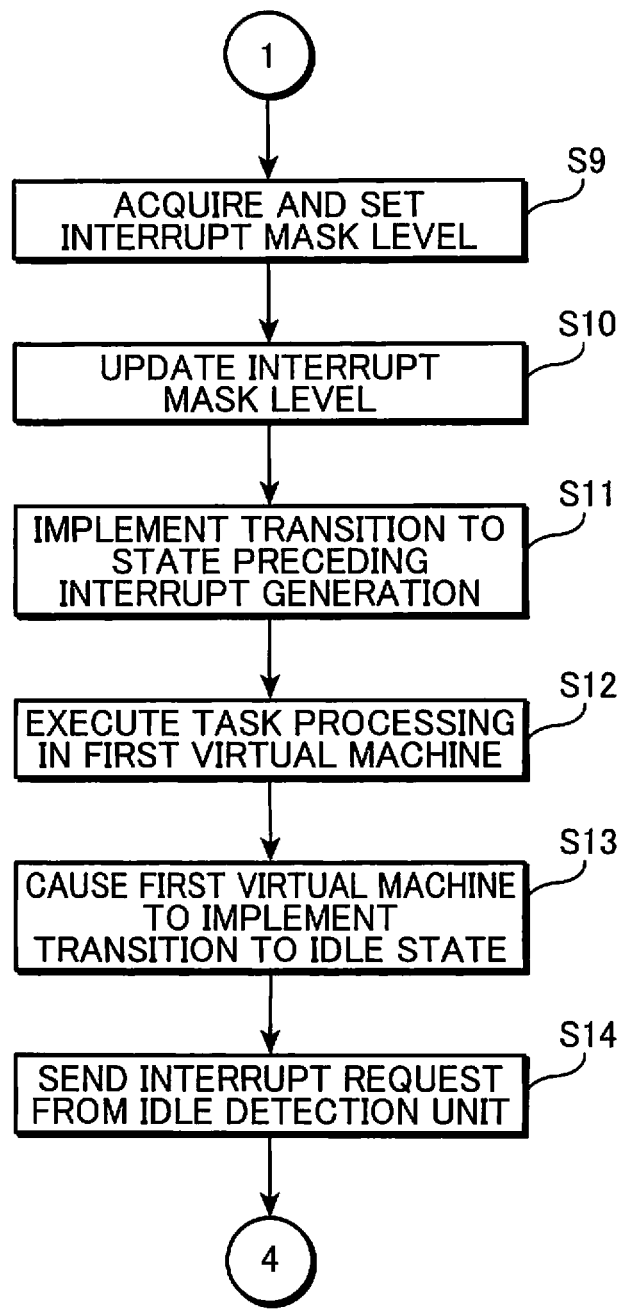
FIG. 8 is a flowchart illustrating an example of operations performed after the processing by the interrupt handler has ended following the processing of step S8 illustrated by FIG. 7.

FIG. 8 is a flowchart illustrating an example of operations performed after the processing by the interrupt handler has ended following the processing of step S8 illustrated by FIG. 7.

The first interrupt mask level setting unit 208 acquires from the interrupt mask level setting table 207 shown in FIG. 6 the interrupt mask level that has been set and sets the acquired interrupt mask level in the second interrupt mask level setting unit 15 (step S9). The first interrupt mask level setting unit 208 notifies to the interrupt mask level update unit 206 that the interrupt mask level has been set. The first interrupt mask level setting unit 208 also acquires an interrupt mask level of the task processing of the virtual machine that is next to execute processing. In this case, since the processing performed by the interrupt handler 320 of the first virtual machine 30 has ended, the interrupt mask level (for example, "4") of the task 300 of the first virtual machine 30 is set.

The interrupt mask level update unit 206 then accesses the interrupt level storing unit 16 shown in FIG. 5, requests that the interrupt mask level be updated to the newest interrupt state, and notifies to the virtual machine schedule unit 202 that the interrupt mask level has been updated (step S10). In other words, a bit is updated to 0 with respect to the interrupt level for which the interrupt cause has been cleared in the interrupt level storing unit 16.

Then, the virtual machine schedule unit 202 acquires the interrupt return destination address from the interrupt return destination storing unit 200 and causes the virtual machine to implement a transition to a state preceding the interrupt generation (step S11). In this case, since the interrupt request has been generated during task processing execution in the first virtual machine 30, the system is returned to task processing by the first virtual machine 30.

The first virtual machine 30 then executes the processing of the task 300 (step S12). In this case, the interrupt mask level has been set to "4" in step S9. Therefore, during task processing execution in the first virtual machine 30, the interrupt from the second interrupt controller 4 for which the interrupt level is "5" is masked and the virtual machines can be scheduled according to the priority shown in FIG. 6.

Where the task processing by the first virtual machine 30 ends, the CPU 1 issues a command to the first virtual machine 30 to implement a transition to the power saving mode (idle state) (step S13).

The idle detection unit 7 detects the command issued in step S13 and sends an interrupt request to the integral interrupt controller 2 (step S14). As a result, the virtual machine control unit 20 can detect the end of task processing in the first virtual machine 30.

Where the integral interrupt controller 2 receives an interrupt request from the idle detection unit 7, the integral interrupt controller 2 outputs an interrupt request to the CPU 1. The CPU 1 outputs an interrupt generation notification to the virtual machine control unit 20. The processing then returns to step S1 shown in FIG. 7, and the interrupt notification reception unit 205 receives the interrupt generation notification outputted from the CPU 1.

Figure 9:
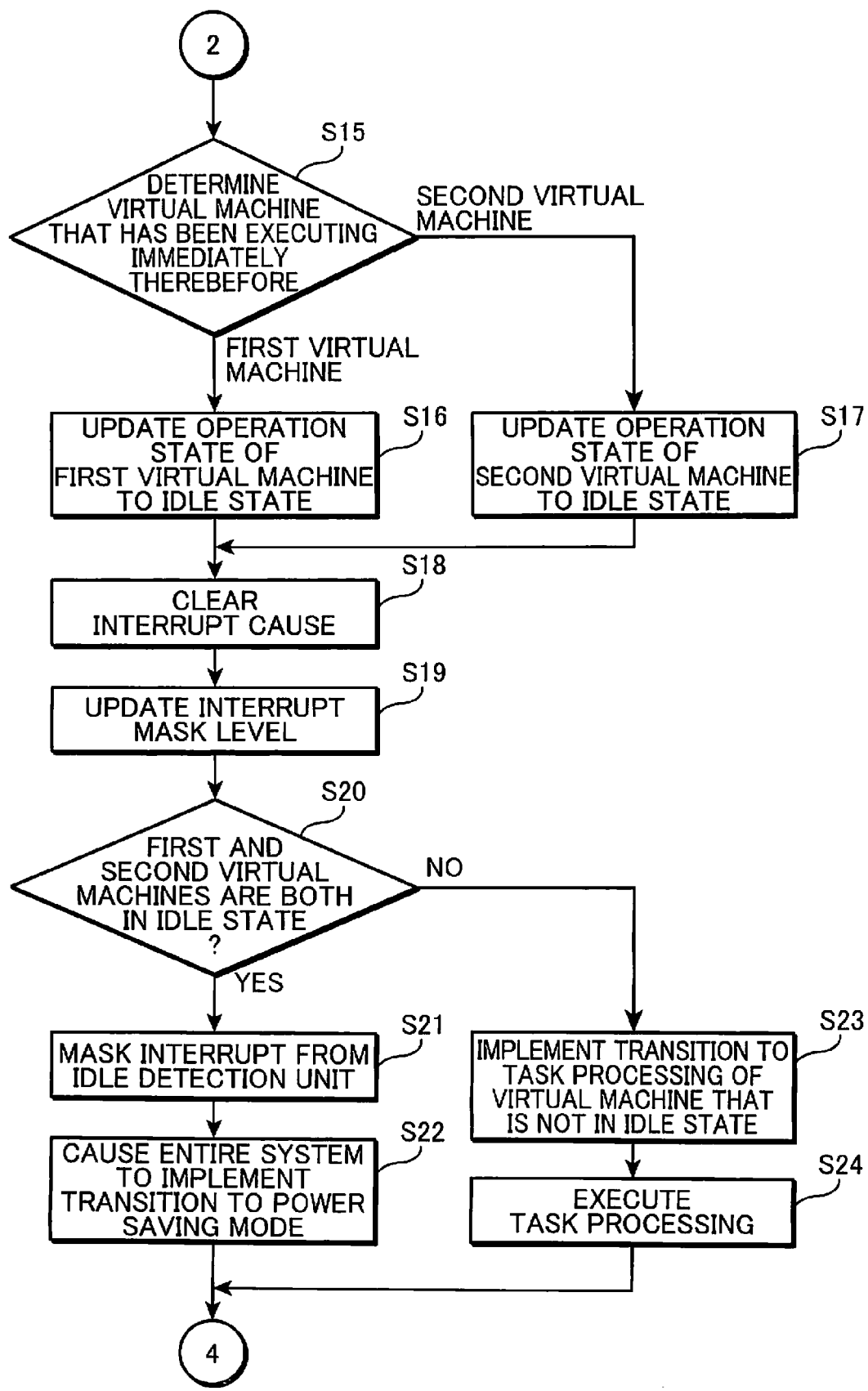
FIG. 9 is a flowchart illustrating an example of operations performed after the interrupt has been determined to be from the idle detection unit in step S2 illustrated by FIG. 7.

FIG. 9 is a flowchart illustrating an example of operations performed after the interrupt has been determined to be from the idle detection unit 7 in step S2 illustrated by FIG. 7.

When the interrupt is determined to be from the idle detection unit 7 as a result of the interrupt type determination ("idle detection unit" in step S2), the first interrupt type determination unit 204 identifies the virtual machine that has been executing the processing immediately therebefore on the basis of the storage contents of the virtual machine state storing unit 201 (step S15).

When the first virtual machine 30 is determined to have been executing the processing immediately therebefore ("first virtual machine" in step S15), the first interrupt type determination unit 204 updates the operation state of the first virtual machine that has been stored in the virtual machine state storing unit 201 to the idle state (step S16). By contrast, when the second virtual machine 40 is determined to have been executing the processing immediately therebefore ("second virtual machine" in step S15), the first interrupt type determination unit 204 updates the operation state of the second virtual machine that has been stored in the virtual machine state storing unit 201 to the idle state (step S17).

After the operation state of the virtual machine in the virtual machine state storing unit 201 has been updated, the interrupt mask level update unit 206 clears the interrupt cause (step S18). The interrupt mask level update unit 206 then accesses the interrupt level storing unit 16, requests that the interrupt mask level be updated to the newest interrupt state, and notifies to the virtual machine schedule unit 202 that the interrupt mask level has been updated (step S19).

The virtual machine schedule unit 202 then verifies the operation state of the virtual machine that has been stored in the virtual machine state storing unit 201 and determines whether both the first virtual machine 30 and the second virtual machine 40 are in the idle state (step S20).

When both the first virtual machine 30 and the second virtual machine 40 are determined to be in the idle state (YES in step S20), the virtual machine schedule unit 202 requests the second interrupt mask setting unit 11 to mask the interrupt from the idle detection unit 7. The second interrupt mask setting unit 11 sets the priority determination unit 14 so as to mask the interrupt from the idle detection unit 7 (step S21). This is executed to mask an interrupt notification generated during command execution to the power saving mode so that the entire system is actually caused to implement a transition to the power saving mode. The CPU 1 then causes the entire system to implement a transition to the power saving mode (step S22). The processing then returns to that of step S1 shown in FIG. 7, and when an interrupt is generated, the interrupt notification reception unit 205 receives the interrupt generation notification outputted from the CPU 1.

By contrast, when the first virtual machine 30 and the second virtual machine 40 are not determined to be both in the idle state, that is, when a virtual machine that is not in the idle state is determined to be present (NO in step S20), the virtual machine schedule unit 202 causes a transition to task processing by the virtual machine that is not in the idle state (step S23).

Further, when the first virtual machine 30 is not in the idle state, the second virtual machine 40 executes the processing of the task 400, and when the second virtual machine 40 is not in the idle state, the first virtual machine 30 executes the processing of the task 300 (step S24). The processing then returns to that of step S1 shown in FIG. 7, and when an interrupt is generated, the interrupt notification reception unit 205 receives the interrupt generation notification outputted from the CPU 1.

Figure 10:
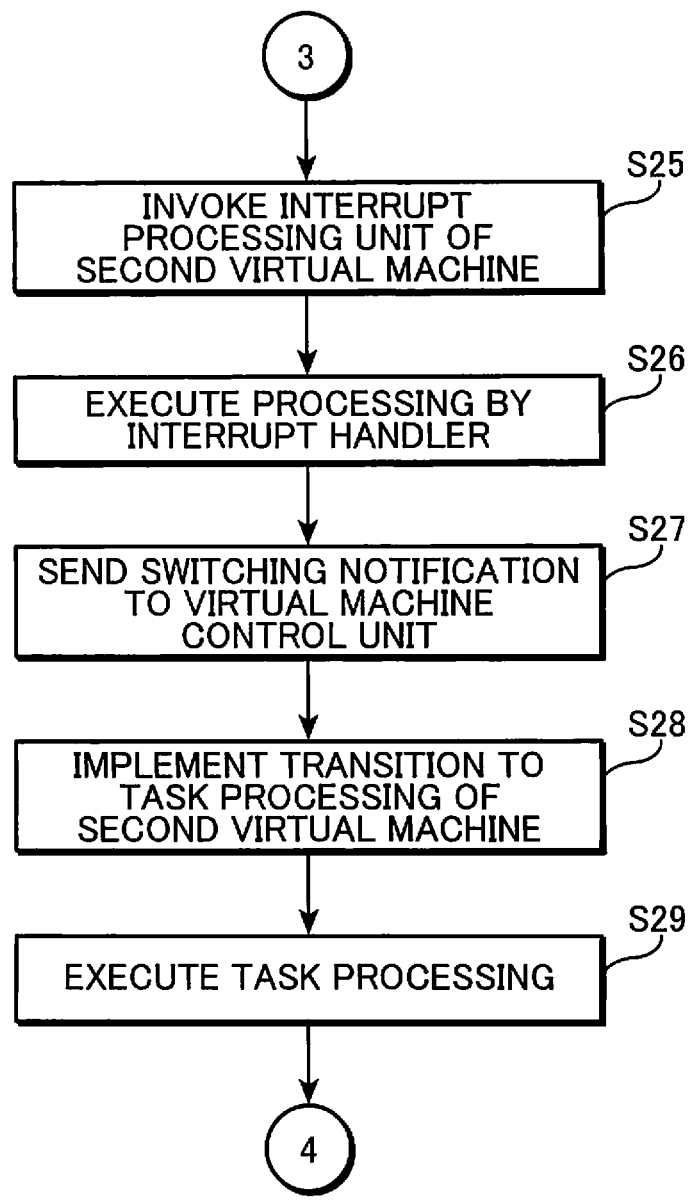
FIG. 10 is a flowchart illustrating an example of operations performed after the interrupt has been determined to be from the second interrupt controller in step S2 illustrated by FIG. 7.

FIG. 10 is a flowchart illustrating an example of operations performed after the interrupt has been determined to be from the second interrupt controller 4 in step S2 illustrated by FIG. 7.

When the interrupt is determined to be from the second interrupt controller 4 as a result of the interrupt type determination ("second interrupt controller" in step S2), the first interrupt type determination unit 204 invokes the virtual machine schedule unit 202. After being invoked by the first interrupt type determination unit 204, the virtual machine schedule unit 202 determines that the interrupt request is to the second virtual machine 40 and invokes the interrupt processing unit 412 of the second virtual machine 40 (step S25).

The interrupt processing unit 412 then executes the processing by the interrupt handler 420 corresponding to the generated interrupt (step S26).

After the processing by the interrupt handler has ended, the interrupt processing unit 412 sends a switching notification that switches the processing that is being executed to the switching notification reception unit 210 of the virtual machine control unit 20 (step S27).

The switching notification reception unit 210 receives the switching notification and notifies the end of the processing by the interrupt handler of the second virtual machine 40 to the virtual machine schedule unit 202. The virtual machine schedule unit 202 causes a transition to task processing by the second virtual machine 40 (step S28). The second virtual machine 40 then executes the processing of the task 400 (step S29). The processing thereafter returns to that of step S1 shown in FIG. 7, and when an interrupt is generated, the interrupt notification reception unit 205 receives the interrupt generation notification outputted from the CPU 1.

With the above-described configuration, the end of the interrupt handler processing and task processing in a virtual machine can be detected by the virtual machine control unit 20, and the interrupt mask level of the integral interrupt controller 2 can be controlled at the detection timing. As a result, the priority of the virtual machine can be determined according to the task priority and schedule control of the appropriate virtual machine can be performed even if the virtual machine cannot notify the task priority.

In particular, even with software incorporating a binary program that cannot notify the task priority, in particular, in the case of software that cannot be modified, such as a purchased binary program, schedule control of the appropriate virtual machine can be performed.

Embodiment 2

Figure 11:
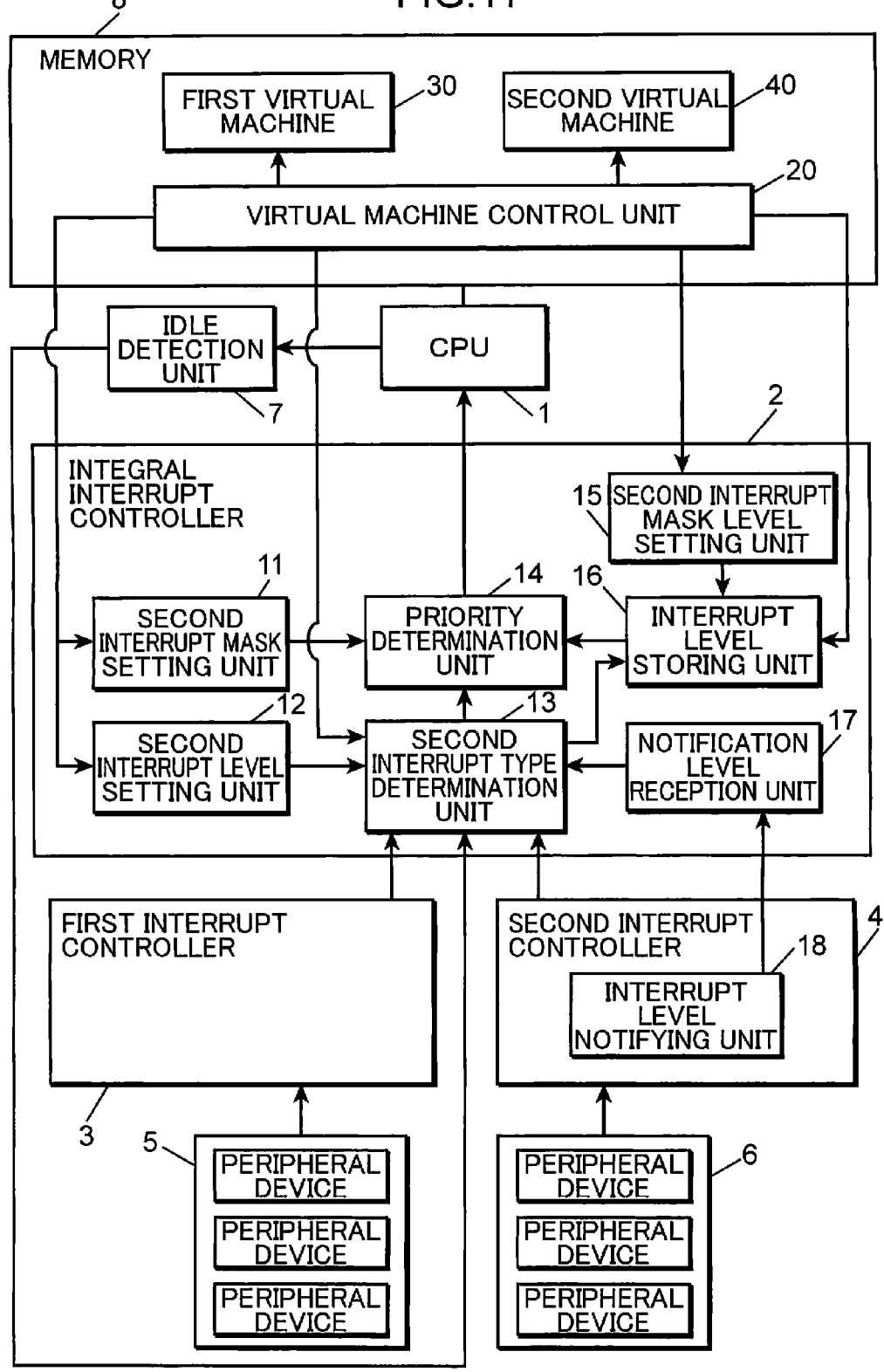
FIG. 11 is a block diagram illustrating the configuration of the information processing device including the virtual machine control device in Embodiment 2 of the present embodiment.

FIG. 11 is a block diagram illustrating the configuration of the information processing device including the virtual machine control device in Embodiment 2 of the present embodiment. In particular, FIG. 11 specifically illustrates the integral interrupt controller 2.

In the configuration shown in FIG. 11, a notification level reception unit 17 is added to the integral interrupt controller 2 shown in FIG. 3, and an interrupt level notifying unit 18 is added to the second interrupt controller 4. Further, in FIG. 11, constituent components identical to those shown in FIG. 3 are denoted with same reference numerals. The newly added constituent components will be described below and the description of identical constituent components will be omitted.

The interrupt level notifying unit 18 notifies a plurality of interrupt levels that differ according to the interrupt type to the integral interrupt controller 2. Thus, the interrupt level notifying unit 18 notifies the levels (priorities) of interrupts that have been set inside the second interrupt controller 4 to the notification level reception unit 17 located in the integral interrupt controller 2 as notification levels.

The notification level reception unit 17 receives the plurality of interrupt levels notified by the interrupt level notifying unit 18 and stores the plurality of received interrupt levels as respective interrupt mask levels in the interrupt mask level setting table 207.

The notification level reception unit 17 receives a notification level from the interrupt level notifying unit 18 and notifies the received notification level to the second interrupt type determination unit 13. As a result, the interrupts from the second interrupt controller 4 can be provided with a priority in the integral interrupt controller 2, and the virtual machine can be controlled on the basis of the priority. In other words, the second interrupt type determination unit 13 outputs the notified notification level to the second interrupt level setting unit 12, and the second interrupt level setting unit 12 sets the interrupt level corresponding to the notification level according to the interrupt type.

With the above-described configuration, the second interrupt type determination unit 13 can acquire the received interrupt type and the interrupt level corresponding to the notification level notified from the notification level reception unit 17 from the second interrupt level setting unit 12 and notify the acquired interrupt level to the interrupt level storing unit 16. In other words, by using the setting of the interrupt mask level setting table 207 in the virtual machine control unit 20, the entire interrupt processing of the second virtual machine 40 or part of the processing can be performed with priority over the task processing of the first virtual machine 30.

Figure 12:
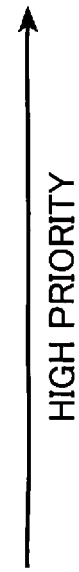
FIG. 12 shows an example of setting contents of the second interrupt level setting table of the integral interrupt controller in Embodiment 2 of the present invention.

FIG. 12 shows an example of setting contents of the second interrupt level setting table 12 of the integral interrupt controller 2 in Embodiment 2 of the present invention. In the description below, an example is explained in which the notification level from the second interrupt controller 4 is constituted by 8 stages "0" to "7".

In FIG. 12, the interrupt level of the interrupt notification from the second interrupt controller 4 with a notification level of "4" to "0" is set to "4", and the interrupt level of the interrupt notification from the second interrupt controller 4 with a notification level of "7" to "5" is set to "6". The smaller is the numerical value of the interrupt level, the higher is the priority. With the above-described configuration, by using the setting of the interrupt mask level setting table 207 in the virtual machine control unit 20, the integral interrupt controller 2 can cause part of the interrupt processing of the second virtual machine 40 to be performed with a priority over the task processing of the first virtual machine 30.

Figure 13:
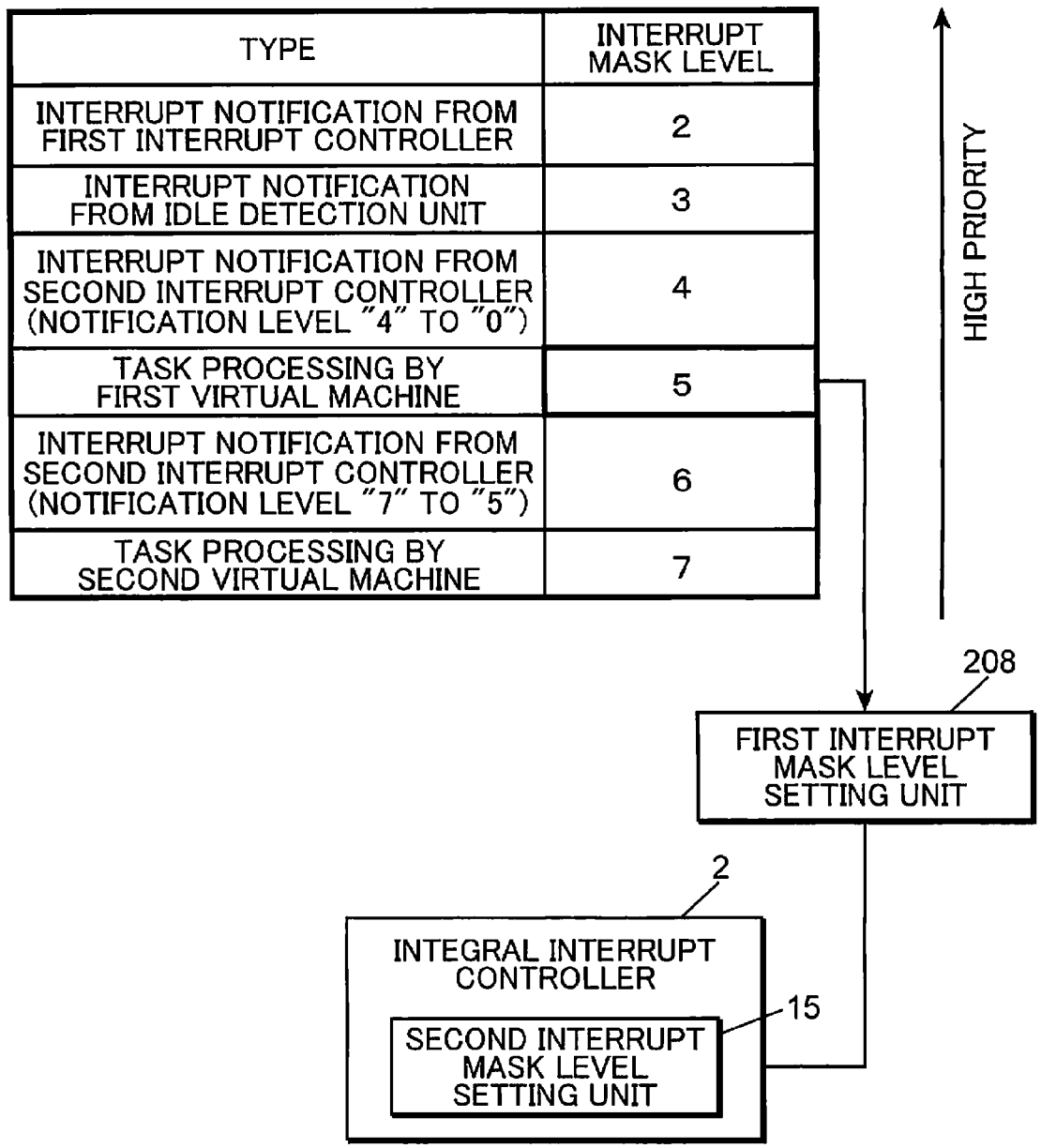
FIG. 13 shows an example of setting contents of the interrupt mask level setting table of the virtual machine control unit in Embodiment 2 of the present invention.

FIG. 13 shows an example of setting contents of the interrupt mask level setting table 207 of the virtual machine control unit 20 in Embodiment 2 of the present invention. The type that is an object of setting an interrupt mask level and the interrupt mask level that will be set for each type are saved in the interrupt mask level setting table 207. In FIG. 13, the interrupt mask level of the interrupt notification from the second interrupt controller 4 with a notification level of "4" to "0" is set to "4", and the interrupt mask level of task processing of the first virtual machine 30 is set to "5". The interrupt mask level of the interrupt notification from the second interrupt controller 4 with a notification level of "7" to "5" is set to "6". As a result, if there is an interrupt from the second interrupt controller 4 with a notification level of "4" to "0", the processing thereof is preferentially performed even when the task 300 of the first virtual machine 30 is being executed.

With the above-described configuration the end of the interrupt handler processing and task processing in a virtual machine can be detected by the virtual machine control unit 20, and the interrupt mask level of the integral interrupt controller 2 can be controlled at the detection timing. As a result, the priority of the virtual machine can be determined according to the task priority and schedule control of the appropriate virtual machine can be performed even if the virtual machine cannot notify the task priority. In particular, by using the setting of the interrupt mask level setting table 207 in the virtual machine control unit 20, it is possible to perform the entire interrupt processing of the second virtual machine 40 or part of the processing with priority over the task processing of the first virtual machine 30.

Embodiment 3

Figure 14:
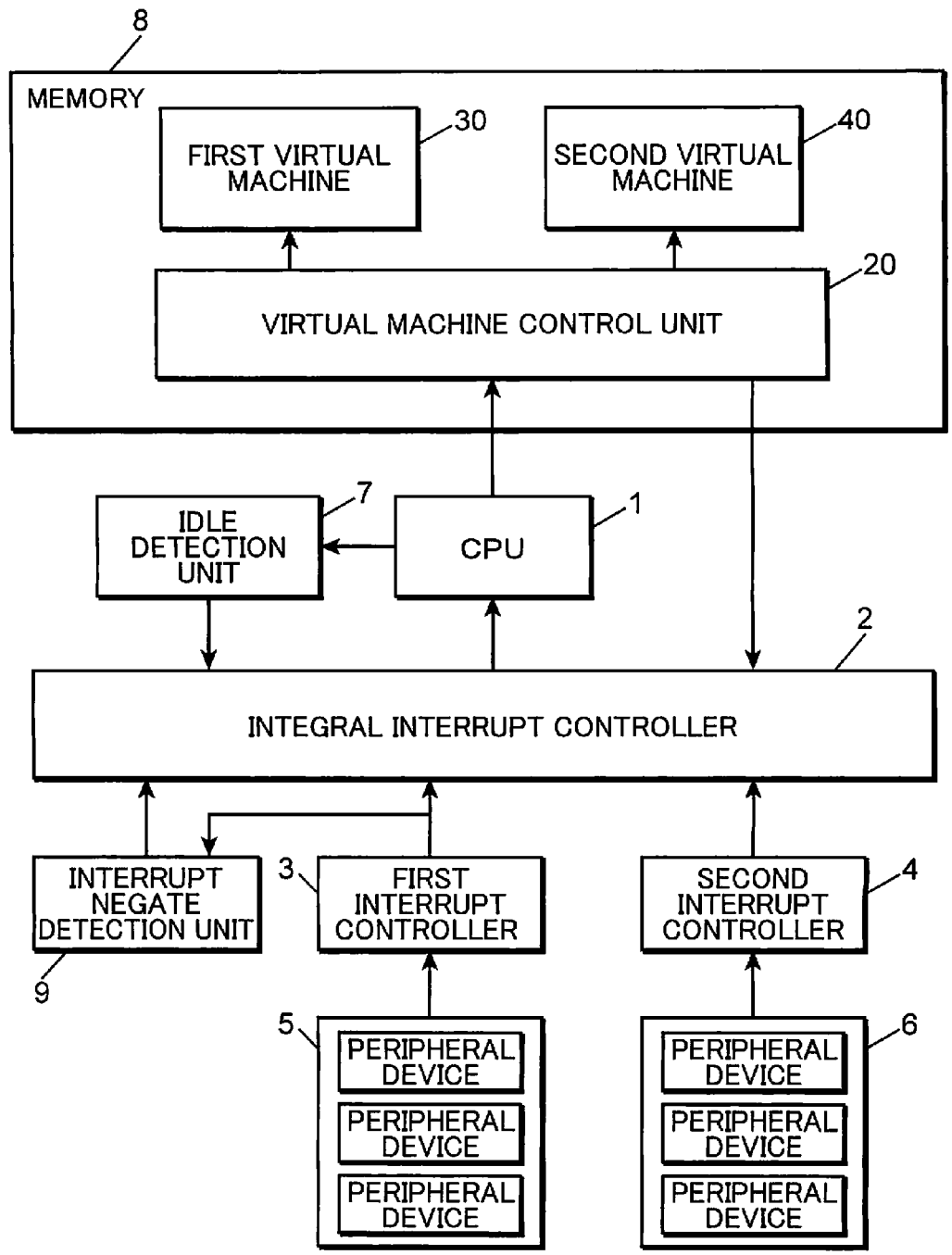
FIG. 14 is a block diagram illustrating a hardware configuration of the information processing device including the virtual machine control device in Embodiment 3 of the present invention.

FIG. 14 is a block diagram illustrating a hardware configuration of the information processing device including the virtual machine control device in Embodiment 3 of the present invention.

In the configuration shown in FIG. 14, an interrupt negate detection unit 9 is added to the information processing device shown in FIG. 1. Further, in FIG. 14, constituent components identical to those shown in FIG. 1 are denoted with same reference numerals. The newly added constituent components will be described below and the description of identical constituent components will be omitted.

The interrupt negate detection unit 9 detects that the interrupt request outputted from the peripheral device 5 has been canceled and generates an interrupt to the integral interrupt controller 2. Thus, the interrupt negate detection unit 9 detects that the interrupt request from the first interrupt controller 3 to the integral interrupt controller 2 has been canceled and notifies to the effect that the interrupt request has been canceled by an interrupt to the integral interrupt controller 2. The cancellation of the interrupt request is performed by clearing the interrupt cause that has generated the interrupt to the first interrupt controller 3. Once the interrupt cause has been cleared, the interrupt signal to the integral interrupt controller 2 is negated. The interrupt negate detection unit 9 detects that the interrupt signal outputted from the first interrupt controller 3 to the integral interrupt controller 2 has been negated.

As a result, it is possible to detect the end of interrupt handler processing to the first virtual machine 30 generated from the first interrupt controller 3 in the virtual machine control unit 20.

Figure 15:
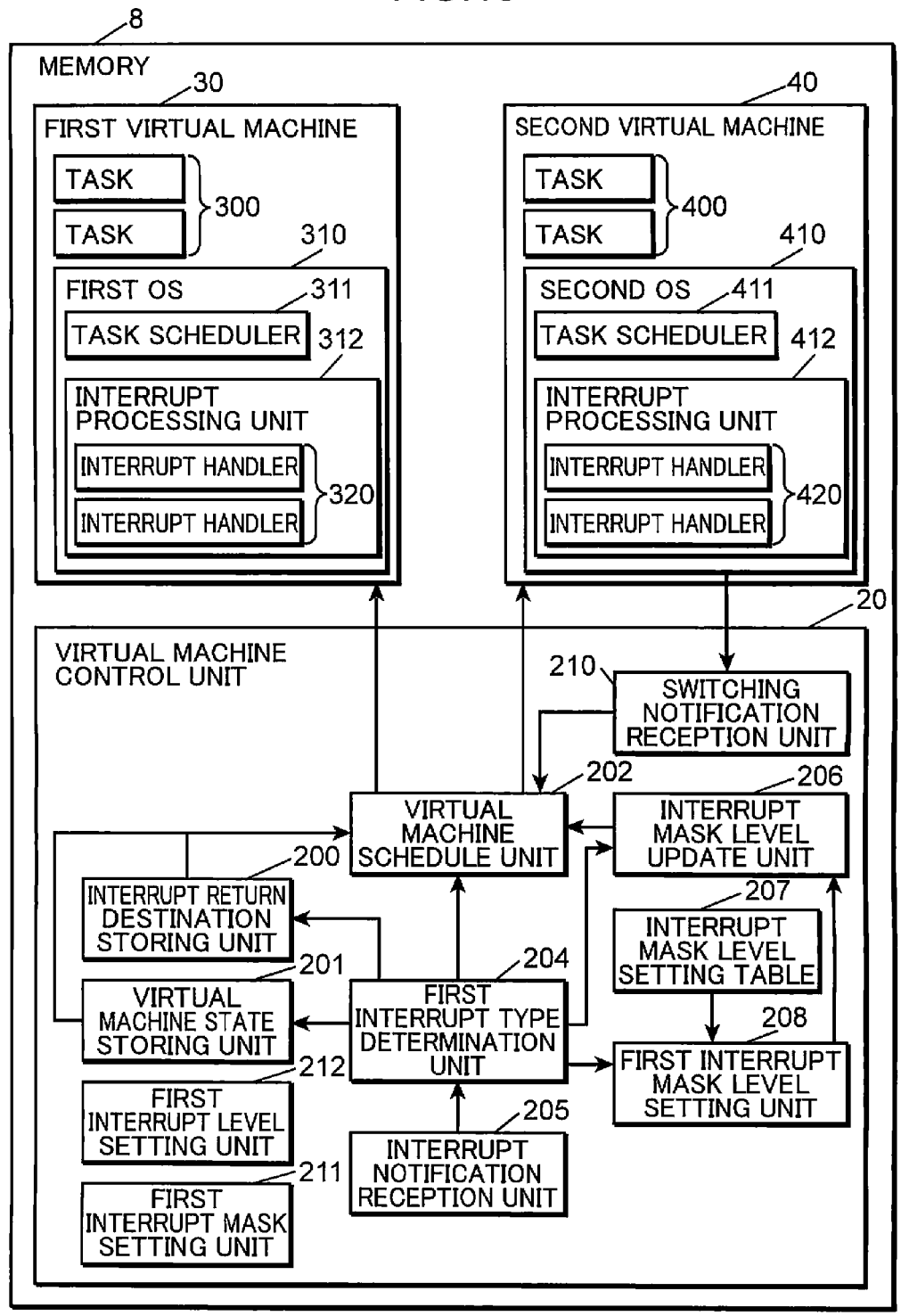
FIG. 15 is a block diagram illustrating a detailed configuration of the memory of the information processing device according to Embodiment 3 of the present invention.

FIG. 15 is a block diagram illustrating a detailed configuration of the memory 8 of the information processing device in Embodiment 3 of the present invention. FIG. 15 shows a configuration obtained by removing the interrupt return destination rewrite unit 203 and the interrupt handler end detection unit 209 from the virtual machine control unit 20 shown in FIG. 2. In Embodiment 3, the interrupt return destination rewrite unit 203 and the interrupt handler end detection unit 209 are removed because the provided interrupt negate detection unit 9 makes it possible to detect the cancellation of the interrupt request.

Figure 16:
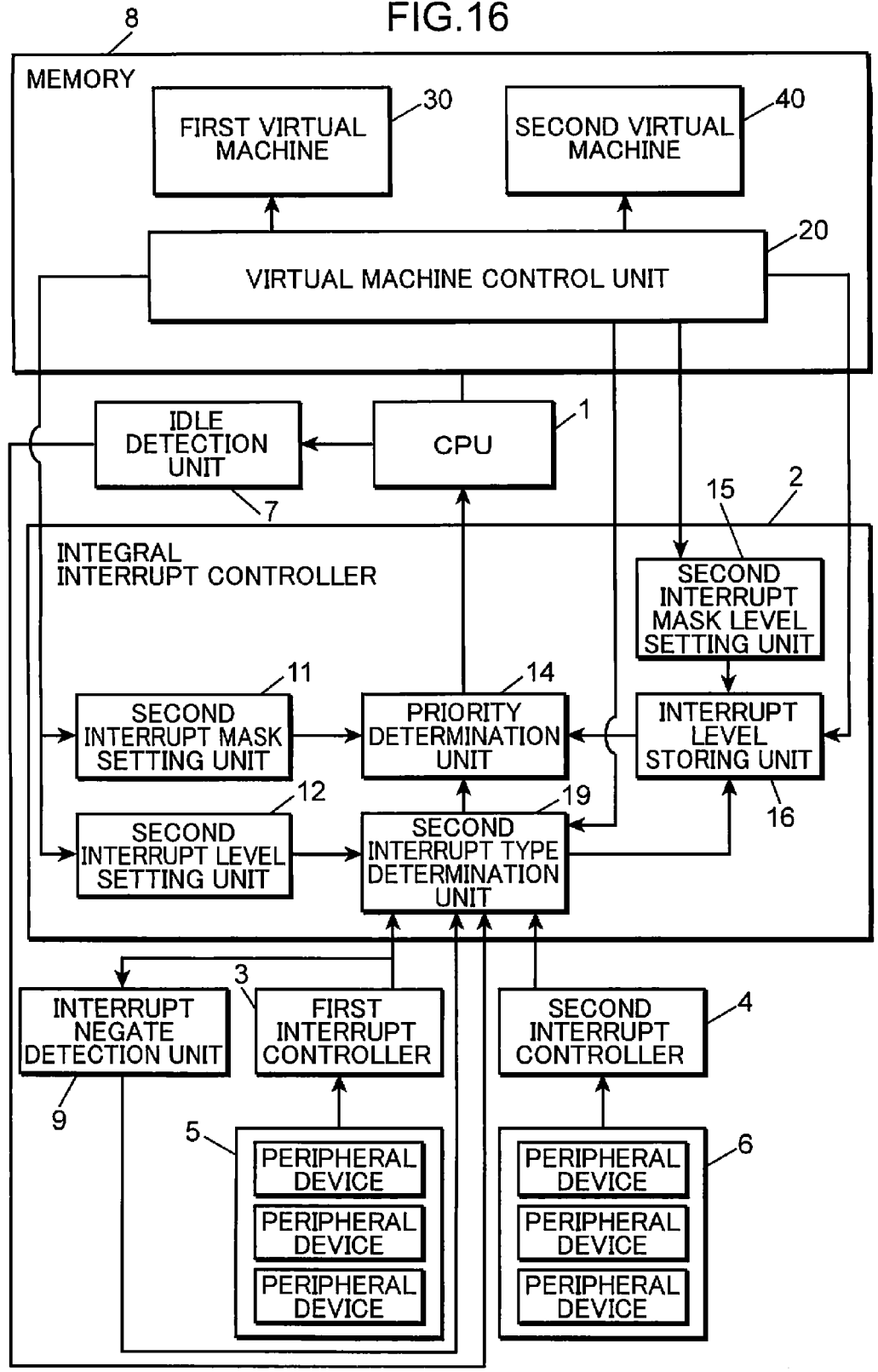
FIG. 16 is a block diagram illustrating a detailed configuration of the integral interrupt controller of the information processing device including the virtual machine control device in Embodiment 3 of the present invention.

FIG. 16 is a block diagram illustrating a detailed configuration of the integral interrupt controller 2 of the information processing device in Embodiment 3 of the present invention. The configuration shown in FIG. 16 differs from that shown in FIG. 3 in that the second interrupt type detection unit 19 of the integral interrupt controller 2 receives an interrupt from the interrupt negate detection unit 9.

FIG. 17 illustrates an example of setting contents of the second interrupt level setting unit 12 of the integral interrupt controller 2 in Embodiment 3 of the present invention. The interrupt type includes an interrupt notification from the interrupt negate detection unit 9, an interrupt notification from the first interrupt controller 3, an interrupt notification from the idle detection unit, and an interrupt notification from the second interrupt controller 4. In the interrupt notification from the interrupt negate detection unit 9, an interrupt level "1" has been set. In other words, when an interrupt is generated from the interrupt negate detection unit 9, a state is assumed in which the interrupt mask level of the interrupt level storing unit 16 is set to "2" and therefore an interrupt notification from the interrupt negate detection unit 9 that has an interrupt level of "1" is received.

Figure 18:
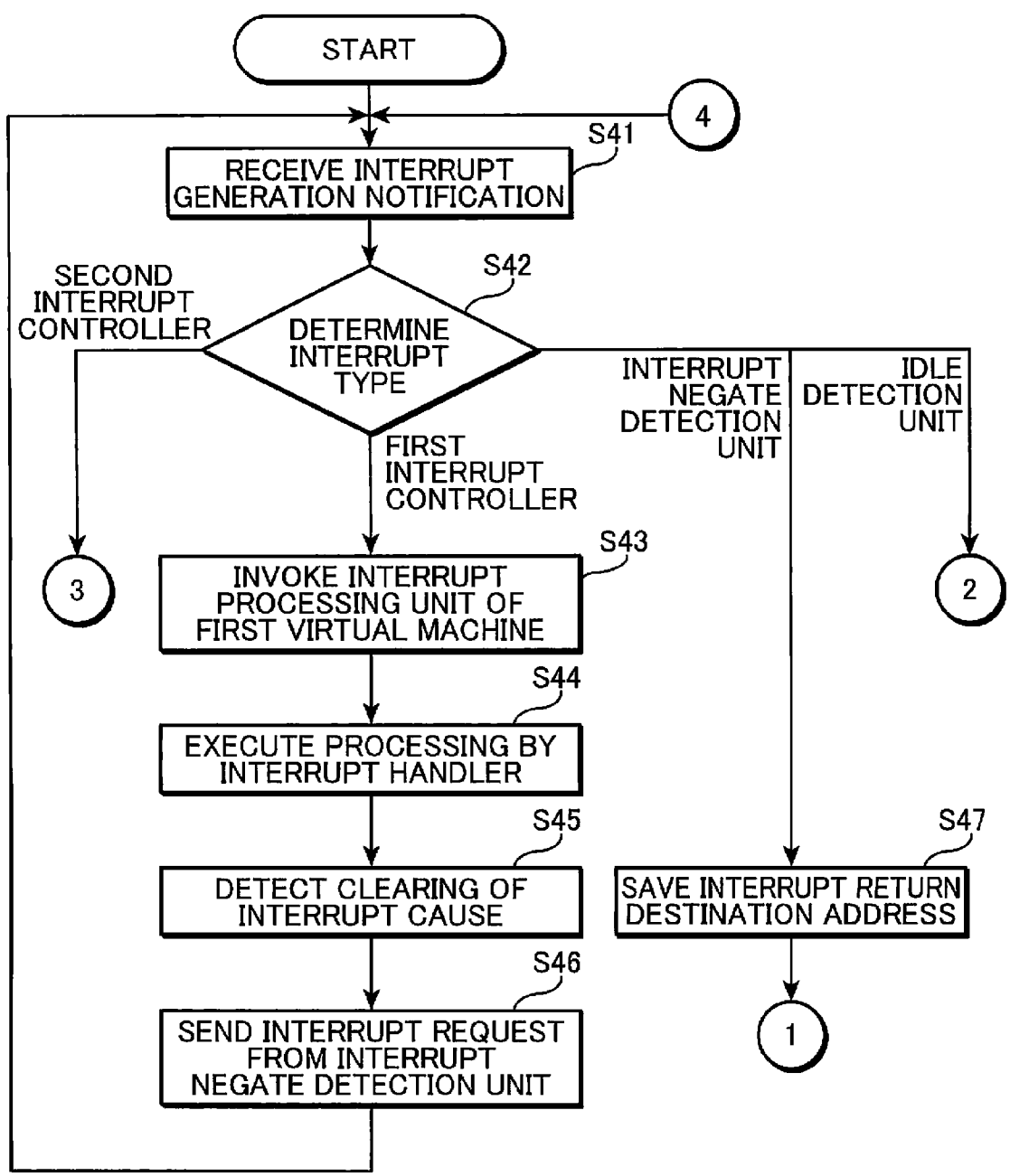
FIG. 18 is a flowchart illustrating an example of operation of the information processing device in the case in which an interrupt from the first interrupt controller has been generated in Embodiment 3 of the present invention.

FIG. 18 is a flowchart illustrating an example of operation of the information processing device in the case in which an interrupt from the first interrupt controller 3 has been generated in Embodiment 3 of the present invention.

When an interrupt from the first interrupt controller 3 is generated during task processing execution in the first virtual machine 30, the virtual machine control unit 20 starts the processing. Where an interrupt is generated, the interrupt notification reception unit 205 receives an interrupt generation notification outputted from the CPU 1 (step S41).

The interrupt notification reception unit 205 notifies the interrupt information indicating that the interrupt has been generated to the first interrupt type determination unit 204. The first interrupt type determination unit 204 then determines the interrupt type of the generated interrupt (step S42). The first interrupt type determination unit 204 acquires the interrupt type that is the object of determination from the second interrupt type determination unit 19 of the integral interrupt controller 2.

When the interrupt is determined to be from the first interrupt controller 3 as a result of the interrupt type determination ("first interrupt controller" in step S42), the first interrupt type determination unit 204 invokes the interrupt processing unit 312 of the first virtual machine 30 (step S43).

When the interrupt is determined to be from the idle detection unit 7 as a result of the interrupt type determination ("idle detection unit" in step S42), a transition is implemented to the above-described processing of step S15 shown in FIG. 9, and when the interrupt is determined to be from the second interrupt controller 4 ("second interrupt controller" in step S42), a transition is implemented to the above-described processing of step S25 shown in FIG. 10.

The interrupt processing unit 312 then invokes the interrupt handler 320 corresponding to the generated interrupt and executes the processing by the interrupt handler 320 (step S44). Where the interrupt cause created by the first interrupt controller 3 is then cleared during the processing performed by the interrupt handler 320, the interrupt negate detection unit 9 detects that the interrupt cause has been cleared (step S45).

The interrupt negate detection unit 9 then sends an interrupt request to the integral interrupt controller 2 (step S46). As a result, the integral interrupt controller 2 generates an interrupt. Thus, where an interrupt request is received from the interrupt negate detection unit 9, the integral interrupt controller 2 outputs an interrupt request to the CPU 1. The CPU 1 outputs an interrupt generation notification to the virtual machine control unit 20. The processing then returns to step S41, and the interrupt notification reception unit 205 receives the interrupt generation notification outputted from the CPU 1.

The interrupt notification reception unit 205 notifies the interrupt information indicating that the interrupt has been generated to the first interrupt type determination unit 204. The first interrupt type determination unit 204 then determines the interrupt type of the generated interrupt (step S42). The first interrupt type determination unit 204 acquires the interrupt type that is the object of determination from the second interrupt type determination unit 19 of the integral interrupt controller 2.

When the interrupt is determined to be from the interrupt negate detection unit 9 as a result of the interrupt type determination ("interrupt negate detection unit" in step S42), the first interrupt type determination unit 204 saves the interrupt return destination address designated by the notified interrupt information in the interrupt return destination storing unit 200 (step S47). A transition is then implemented to the aforementioned processing of step S9 shown in FIG. 8.

With the above-described configuration, the end of processing performed by the interrupt handler 320 of the first virtual machine 30 can be detected by using the interrupt negate detection unit 9 and the first interrupt type determination unit 204. As a result, the priority of the virtual machine can be determined according to the task priority and schedule control of the appropriate virtual machine can be performed even if the virtual machine cannot notify the task priority.

Embodiment 4

Figure 19:
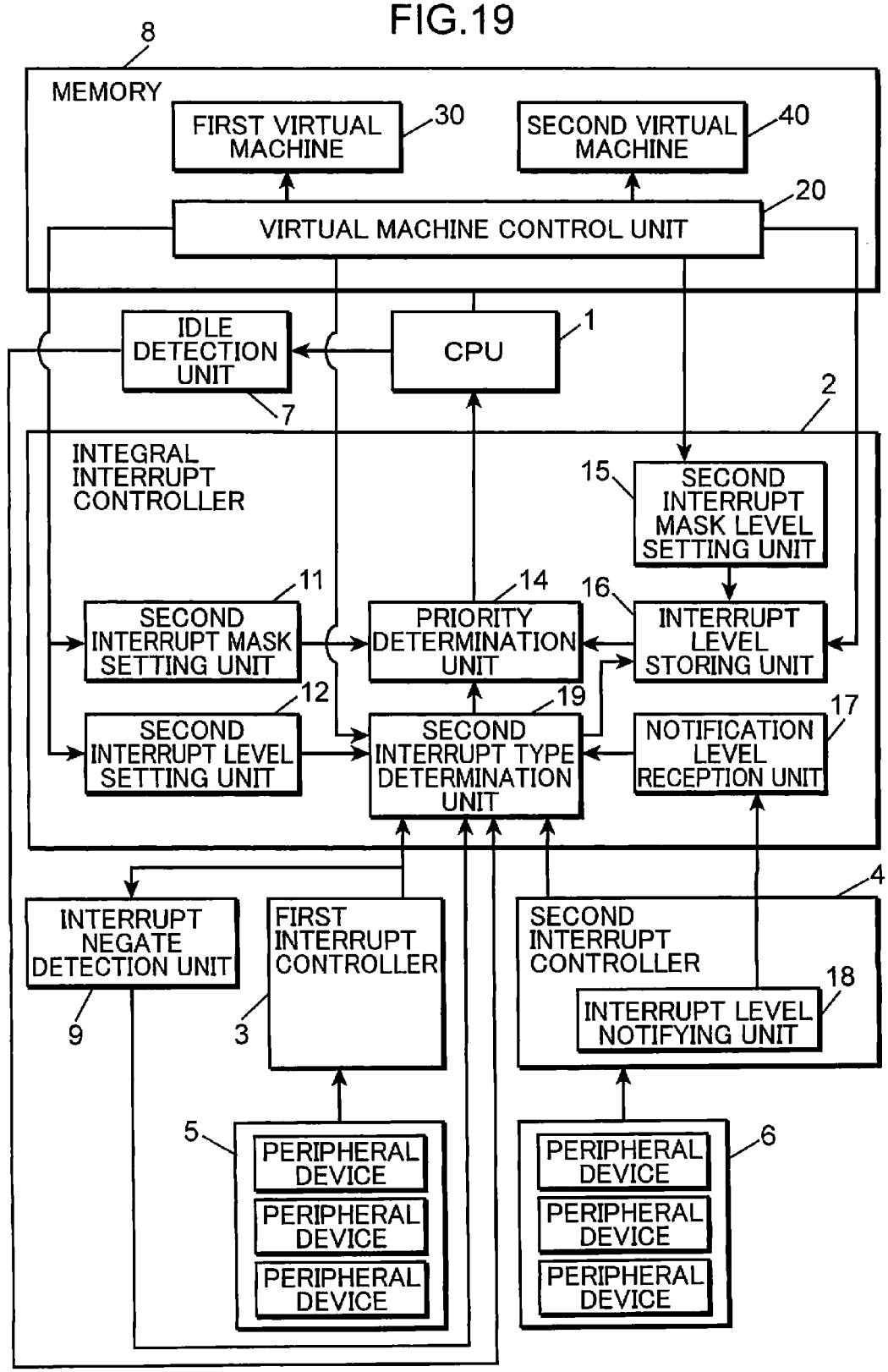
FIG. 19 is a block diagram illustrating a configuration of the information processing device including the virtual machine control device in Embodiment 4 of the present invention.

FIG. 19 is a block diagram illustrating a configuration of the information processing device including the virtual machine control device in Embodiment 4 of the present invention. In particular, FIG. 19 shows the detailed configuration of the integral interrupt controller 2.

The configuration of the information processing device shown in FIG. 19 is obtained by adding the interrupt negate detection unit 9 to the configuration of the information processing device shown in FIG. 11. The difference between the obtained configuration and that shown in FIG. 16 is that the integral interrupt controller 2 is provided with the notification level reception unit 17 shown in FIG. 11, and the second interrupt controller 4 is provided with the interrupt level notifying unit 18 shown in FIG. 11.

The interrupt level notifying unit 18 notifies the level (priority) of each interrupt that has been set in the second interrupt controller 4 to the notification level reception unit 17 in the integral interrupt controller 2 as a notification level.

The notification level reception unit 17 receives the notification level from the interrupt level notifying unit 18 and notifies the received notification level to the second interrupt type determination unit 19. As a result, the interrupts from the second interrupt controller 4 can be provided with a priority in the integral interrupt controller 2, and the virtual machine can be controlled on the basis of the priority. In other words, the second interrupt type determination unit 19 outputs the notified notification level to the second interrupt level setting unit 12, and the second interrupt level setting unit 12 sets the interrupt level corresponding to the notification level according to the interrupt type.

Further, the interrupt negate detection unit 9 detects that the interrupt request from the first interrupt controller 3 to the integral interrupt controller 2 has been canceled and notifies to the effect that the interrupt request has been canceled by an interrupt to the integral interrupt controller 2. The cancellation of the interrupt request is performed by clearing the interrupt cause that has generated the interrupt to the first interrupt controller 3. Once the interrupt cause has been cleared, the interrupt signal to the integral interrupt controller 2 is negated. The interrupt negate detection unit 9 detects that the interrupt signal outputted from the first interrupt controller 3 to the integral interrupt controller 2 has been negated.

As a result, it is possible to detect the end of interrupt handler processing to the first virtual machine 30 generated from the first interrupt controller 3 in the virtual machine control unit 20.

With the above-described configuration, the second interrupt type determination unit 19 can acquire the received interrupt type and the interrupt level corresponding to the notification level notified from the notification level reception unit 17 from the second interrupt level setting unit 12 and notify the acquired interrupt level to the interrupt level storing unit 16. In other words, by using the setting of the interrupt mask level setting table 207 in the virtual machine control unit 20, the entire interrupt processing of the second virtual machine 40 or part of the processing can be performed with priority over the task processing of the first virtual machine 30.

Further, the end of processing performed by the interrupt handler 320 of the first virtual machine 30 can be detected by using the interrupt negate detection unit 9 and the first interrupt type determination unit 204. As a result, the priority of the virtual machine can be determined according to the task priority and schedule control of the appropriate virtual machine can be performed even if the virtual machine cannot notify the task priority.

With the above-described Embodiments 1 to 4, task processing and interrupt processing can be executed according to the designed priority with respect to a virtual machine in which software cannot be modified.

In the description above, embodiments with two virtual machines are described, but the present invention is not limited to these embodiments. The present invention can be similarly used also in the case in which the information processing device uses three or more virtual machines.

Further, in Embodiments 1 to 4, the integral interrupt controller 2, virtual machine control unit 20, and idle detection unit 7 are constituted by separate hardware, but the present invention is not limited to such a configuration, and the integral interrupt controller 2, virtual machine control unit 20, and idle detection unit 7 may be constituted by a program. In this case, a virtual machine control program that causes the CPU 1 to function as the integral interrupt controller 2, virtual machine control unit 20, and idle detection unit 7 is stored in the memory 8. The virtual machine control program may be recorded on a computer-readable recording medium.

The functional blocks in accordance with the present invention are typically realized as software, but they may be also realized as a LSI, which is an integral circuit. The functional blocks may be individually provided as single chips, or some or all of them may be provided on a single chip. A term "LSI" is used herein, but depending on the degree of integration the circuit can be also called IC, system LSI, super LSI, or ultra LSI. The integration method is not limited to LSI and can be realized by special circuits or a general-use processor. After the LSI manufacture, a programmable FPGA (Field Programmable Gate Array) and a reconfigurable processor in which the connection or setting of circuit cells in the LSI can be reconfigured can be used. Further, where a circuit integration technique that can replace the LSI emerges as a result of progress or derivation in the semiconductor technology, the functional blocks obviously may be integrated by using this technique. For example, it is possible that biotechnology could be adopted as the circuit integration technique that can replace the LSI.

The invention having the following features is mainly included in the above-described specific embodiments.

The virtual machine control device according to one aspect of the present invention includes a virtual machine control unit that controls switching of a plurality of virtual machines operating on a CPU, and an interrupt control unit that controls notification of an interrupt to the virtual machine control unit on the basis of an interrupt level indicating a priority of the generated interrupt, wherein the virtual machine control unit includes a first interrupt type determination unit that determines a type of the interrupt notified from the interrupt control unit; an interrupt return destination storing unit that saves a program counter value immediately preceding the interrupt generation when the generated interrupt is determined to be an interrupt relating to a presently active virtual machine on the basis of the interrupt type determined by the first interrupt type determination unit; an interrupt mask level setting table that stores in advance as a first interrupt mask level a priority of an interrupt processing executed in each virtual machine and a priority of a task processing executed in each virtual machine; a first interrupt mask level setting unit that notifies to the interrupt control unit a first interrupt mask level corresponding to a next processing to be executed by the virtual machine from among the interrupt mask levels in the interrupt mask level setting table when the interrupt processing by the virtual machine has ended, and an update unit that requests the interrupt control unit to update an interrupt level in the interrupt control unit to the newest state, and the interrupt control unit includes an interrupt level storing unit that saves one or more interrupt levels indicating the priority of the generated interrupt and saves the interrupt level having the highest priority among the saved interrupt levels as a second interrupt mask level; a second interrupt mask level setting unit that sets in the interrupt level storing unit as an interrupt level the first interrupt mask level notified by the first interrupt mask level setting unit; a second interrupt type determination unit that receives the newly generated interrupt, determines a type of the newly generated interrupt, and sets in the interrupt level storing unit an interrupt level corresponding to the determined interrupt type, and a priority determination unit that compares the second interrupt mask level saved in the interrupt level storing unit with an interrupt level of the newly generated interrupt notified from the second interrupt type determination unit, and notifies an interrupt to the virtual machine control unit when the interrupt level of the newly generated interrupt is higher than the second interrupt mask level saved in the interrupt level storing unit.

With such a configuration, the virtual machine control unit controls switching of a plurality of virtual machines operating on a CPU, and the interrupt control unit controls notification of an interrupt to the virtual machine control unit on the basis of an interrupt level indicating a priority of the generated interrupt. A program counter value immediately preceding the interrupt generation is saved when the generated interrupt is determined to be an interrupt relating to a presently active virtual machine on the basis of the interrupt type determined by the first interrupt type determination unit. The interrupt mask level setting table stores in advance a priority of an interrupt processing executed in each virtual machine and a priority of a task processing executed in each virtual machine as a first interrupt mask level. A first interrupt mask level corresponding to the next processing to be executed by the virtual machine, from among the interrupt mask levels in the interrupt mask level setting table, is notified to the interrupt control unit when the interrupt processing by the virtual machine has ended. Further, the interrupt control unit is requested to update an interrupt level in the interrupt control unit to the newest state. The interrupt level storing unit saves one or more interrupt levels indicating the priority of the generated interrupt and saves the interrupt level with the highest priority among the saved interrupt levels as a second interrupt mask level. The notified first interrupt mask level is set as an interrupt level in the interrupt level storing unit. The newly generated interrupt is received, a type of the newly generated interrupt is determined, and an interrupt level corresponding to the determined interrupt type is set in the interrupt level storing unit. The second interrupt mask level saved in the interrupt level storing unit is compared with the interrupt level of the newly generated interrupt notified from the second interrupt type determination unit and an interrupt is notified to the virtual machine control unit when the interrupt level of the newly generated interrupt is higher than the second interrupt mask level saved in the interrupt level storing unit.

Therefore, by updating the priority for masking an interrupt in the interrupt control unit at a timing at which the interrupt processing of the virtual machine has ended, it is possible to determine the priority of the virtual machine according to the task priority and control adequately the switching of virtual machines even if the virtual machines cannot notify the task priority.

It is preferred that in the virtual machine control device, the interrupt control unit further include an interrupt level setting unit that stores interrupt levels corresponding to interrupt types; the interrupt level storing unit store an interrupt level of the interrupt received by the second interrupt type determination unit as an interrupt level corresponding to the type of the interrupt that has been stored in advance in the interrupt level setting unit, and further store as an interrupt level the first interrupt mask level notified from the first interrupt mask level setting unit to the second interrupt mask level setting unit, and the priority determination unit do not notify to the virtual machine control unit an interrupt having a level equal to or less than the interrupt level having the highest priority among the interrupt levels that have been stored in the interrupt level storing unit.

With such a configuration, interrupt levels corresponding to interrupt types are stored in the interrupt level setting unit. The interrupt level storing unit saves an interrupt level of the interrupt received by the second interrupt type determination unit as an interrupt level corresponding to the type of the interrupt that has been stored in advance in the interrupt level setting unit, and further saves as an interrupt level a first interrupt mask level notified from the first interrupt mask level setting unit to the second interrupt mask level setting unit. An interrupt with a level equal to or less than the interrupt level with the highest priority among the interrupt levels that have been saved in the interrupt level storing unit is not notified to the virtual machine control unit.

Therefore, the interrupt level corresponding to the interrupt notified to the interrupt control level can be adequately saved in the interrupt level storing unit.

It is preferred that the virtual machine control device further include an idle detection unit that detects that the CPU has executed a command for implementing a transition to an idle state and outputs an interrupt request to the second interrupt type determination unit.

With such a configuration, the execution of a command for implementing a transition to an idle state by the CPU is detected and an interrupt request is outputted to the second interrupt type determination unit. Therefore, the transition of the CPU to the idle state, that is, the transition of the operation state of the virtual machine to the idle state, can be detected and the interrupt control unit can be controlled according to the detection result.

It is preferred that in the virtual machine control device, the virtual machine control unit further include a virtual machine state storing unit that stores operation states of a plurality of virtual machines; the interrupt control unit further include an interrupt mask setting unit that sets the priority determination unit so as to mask the generated interrupt request in order not to notify an interrupt request to the virtual machine control unit; the second interrupt type determination unit update an operation state of the virtual machine, which has been active immediately before, stored in the virtual machine state storing unit to an idle state when the generated interrupt has been determined to be an interrupt request from the idle detection unit, and the interrupt mask setting unit set the priority determination unit so as to mask an interrupt request from the idle detection unit and cause all of the virtual machines to implement a transition to the idle state when the operation states of all of the virtual machines are the idle state.

With such a configuration, the virtual machine state storing unit saves operation states of a plurality of virtual machines. Further, an operation state of the virtual machine that was active immediately before saving to the virtual machine state storing unit is updated to an idle state when the generated interrupt has been determined to be an interrupt request from the idle detection unit. The setting is performed so as to mask an interrupt request from the idle detection unit and the virtual machine control device is caused to make a transition to the idle state when the operation states of all of the virtual machines are the idle state.

Therefore, the virtual machine control device is caused to implement a transition to the idle state when the operation states of all of the virtual machines are the idle state and therefore when one virtual machine from among a plurality of virtual machines is in the idle state and other virtual machines are not in the idle state, the virtual machine control device does not implement a transition to the idle state and the virtual machine control device can be reliably caused to implement a transition to the idle state.

It is preferred that the virtual machine control device further include an interrupt level notifying unit that notifies a plurality of interrupt levels that differ according to the type of interrupt to the interrupt control unit, wherein the interrupt control unit further comprises a notification level reception unit that receives the plurality of interrupt levels notified by the interrupt level notifying unit and stores the received plurality of interrupt levels as respective first interrupt mask levels in the interrupt mask level setting table.

With such a configuration, a plurality of interrupt levels that differ according to the type of interrupt is notified to the interrupt control unit. In the interrupt control unit, the notified plurality of interrupt levels is received, and the received plurality of interrupt levels is stored as respective first interrupt mask levels in the interrupt mask level setting table.

Therefore, in one virtual machine from among the plurality of virtual machines, the priorities that differ according to the interrupt type can be set in the interrupt mask level setting table, and the entire interrupt processing of the one virtual machine or part of the processing can be performed with a priority over the task processing of other virtual machines.

It is preferred that in the above-described virtual machine control device, the virtual machine control unit include an interrupt end detection unit that detects that the interrupt processing by the virtual machine has ended, and an interrupt return destination rewrite unit that saves in the interrupt return destination storing unit an interrupt return destination address designated by the notified interrupt and rewrites the interrupt return destination address in an address of the interrupt end detection unit.

With such a configuration, the interrupt end detection unit detects that the interrupt processing by a virtual machine has ended and the interrupt return destination rewrite unit saves an interrupt return destination address designated by the notified interrupt in the interrupt return destination storing unit and rewrites the interrupt return destination address in an address of the interrupt end detection unit.

Therefore, where the interrupt processing performed by the virtual machine ends, the interrupt end detection unit detects that the interrupt processing has ended. Therefore, the end of the interrupt processing can be reliably detected.

It is preferred that the above-described virtual machine control device further include an interrupt negate detection unit that detects that an interrupt request outputted from a peripheral device has been canceled and generates an interrupt to the interrupt control unit.

With such a configuration, since the interrupt negate detection unit detects that an interrupt request outputted from a peripheral device has been canceled and generates an interrupt to the interrupt control unit, the end of the interrupt processing cad be detected with hardware and the end of the interrupt processing can be reliably detected.

The virtual machine control program according to another aspect of the present invention causes a computer to function as a virtual machine control unit that controls switching of a plurality of virtual machines operating on a CPU, and an interrupt control unit that controls notification of an interrupt to the virtual machine control unit on the basis of an interrupt level indicating a priority of the generated interrupt, wherein the virtual machine control unit includes: a first interrupt type determination unit that determines a type of the interrupt notified from the interrupt control unit; an interrupt return destination storing unit that store a program counter value immediately preceding the interrupt generation when the generated interrupt is determined to be an interrupt relating to a presently active virtual machine on the basis of the interrupt type determined by the first interrupt type determination unit; an interrupt mask level setting table that stores in advance as a first interrupt mask level a priority of an interrupt processing executed in each virtual machine and a priority of a task processing executed in each virtual machine; a first interrupt mask level setting unit that notifies to the interrupt control unit a first interrupt mask level corresponding to a next processing to be executed by the virtual machine from among the interrupt mask levels in the interrupt mask level setting table when the interrupt processing by the virtual machine has ended, and an update unit that requests the interrupt control unit to update the interrupt level in the interrupt control unit to the newest state, and the interrupt control unit includes: an interrupt level storing unit that stores one or more interrupt levels indicating the priority of the generated interrupt and stores as a second interrupt mask level the interrupt level having the highest priority among the stored interrupt levels; a second interrupt mask level setting unit that sets in the interrupt level storing unit as an interrupt level the first interrupt mask level notified by the first interrupt mask level setting unit; a second interrupt type determination unit that receives the newly generated interrupt, determines a type of the newly generated interrupt, and sets in the interrupt level storing unit an interrupt level corresponding to the determined interrupt type, and a priority determination unit that compares the second interrupt mask level stored in the interrupt level storing unit with an interrupt level of the newly generated interrupt notified from the second interrupt type determination unit, and notifies the interrupt to the virtual machine control unit when the interrupt level of the newly generated interrupt is higher than the second interrupt mask level stored in the interrupt level storing unit.

With such a configuration, the virtual machine control unit controls switching of a plurality of virtual machines operating on a CPU, and the interrupt control unit controls notification of an interrupt to the virtual machine control unit on the basis of an interrupt level indicating a priority of the generated interrupt. A type of the interrupt notified from the interrupt control unit is determined and a program counter value immediately preceding the interrupt generation is stored when the generated interrupt is determined to be an interrupt relating to a presently active virtual machine on the basis of the determined interrupt type. The interrupt mask level setting table stores in advance as a first interrupt mask level a priority of an interrupt processing executed in each virtual machine and a priority of a task processing executed in each virtual machine. A first interrupt mask level corresponding to a next processing to be executed by the virtual machine from among the interrupt mask levels in the interrupt mask level setting table is notified to the interrupt control unit when the interrupt processing by the virtual machine has ended. The interrupt control unit is requested to update an interrupt level in the interrupt control unit to the newest state. The interrupt level storing unit stores one or more interrupt levels indicating the priority of the generated interrupt and stores as a second interrupt mask level the interrupt level having the highest priority among the stored interrupt levels. The notified first interrupt mask level is set as an interrupt level in the interrupt level storing unit. The newly generated interrupt is received, the type of the newly generated interrupt is determined, and an interrupt level corresponding to the determined interrupt type in the interrupt level storing unit is set. The second interrupt mask level stored in the interrupt level storing unit is compared with the interrupt level of the newly generated interrupt notified from the second interrupt type determination unit, and an interrupt to the virtual machine control unit is notified when the interrupt level of the newly generated interrupt is higher than the second interrupt mask level stored in the interrupt level storing unit.

Therefore, by updating the priority for masking an interrupt in the interrupt control unit at a timing at which the interrupt processing of the virtual machine has ended, it is possible to determine the priority of the virtual machine according to the task priority and control adequately the switching of virtual machines even if the virtual machines cannot notify the task priority.

The virtual machine control circuit according to another aspect of the present invention includes a virtual machine control circuit that controls switching of a plurality of virtual machines operating on a CPU, and an interrupt control circuit that controls notification of an interrupt to the virtual machine control circuit on the basis of an interrupt level indicating a priority of the generated interrupt, wherein the virtual machine control circuit includes: a first interrupt type determination circuit that determines a type of the interrupt notified from the interrupt control circuit; an interrupt return destination storing circuit that stores a program counter value immediately preceding the interrupt generation when the generated interrupt is determined to be an interrupt relating to a presently active virtual machine on the basis of the interrupt type determined by the first interrupt type determination circuit; an interrupt mask level setting table that stores in advance as a first interrupt mask level a priority of an interrupt processing executed in each virtual machine and a priority of a task processing executed in each virtual machine; a first interrupt mask level setting circuit that notifies to the interrupt control circuit the first interrupt mask level corresponding to a next processing to be executed by the virtual machine from among the interrupt mask levels in the interrupt mask level setting table when the interrupt processing by the virtual machine has ended, and an update circuit that requests the interrupt control circuit to update an interrupt level in the interrupt control circuit to the newest state, and the interrupt control circuit includes: an interrupt level storing circuit that stores one or more interrupt levels indicating the priority of the generated interrupt and stores as a second interrupt mask level the interrupt level having the highest priority among the stored interrupt levels; a second interrupt mask level setting circuit that sets in the interrupt level storing circuit as an interrupt level the first interrupt mask level notified by the first interrupt mask level setting circuit; a second interrupt type determination circuit that receives the newly generated interrupt, determines a type of the newly generated interrupt, and sets in the interrupt level storing circuit an interrupt level corresponding to the determined interrupt type, and a priority determination circuit that compares the second interrupt mask level stored in the interrupt level storing circuit with an interrupt level of the newly generated interrupt notified from the second interrupt type determination circuit, and notifies the interrupt to the virtual machine control circuit when the interrupt level of the newly generated interrupt is higher than the second interrupt mask level stored in the interrupt level storing circuit.

With such a configuration, the virtual machine control circuit controls switching of a plurality of virtual machines operating on a CPU, and the interrupt control circuit controls notification of an interrupt to the virtual machine control circuit on the basis of an interrupt level indicating a priority of the generated interrupt. A type of the interrupt notified from the interrupt control circuit is determined and a program counter value immediately preceding the interrupt generation is saved when the generated interrupt is determined to be an interrupt relating to a presently active virtual machine on the basis of the determined interrupt type. The interrupt mask level setting table stores in advance a priority of an interrupt processing executed in each virtual machine and a priority of a task processing executed in each virtual machine as a first interrupt mask level. A first interrupt mask level corresponding to the next processing to be executed by the virtual machine from among the interrupt mask levels in the interrupt mask level setting table is notified to the interrupt control circuit when the interrupt processing by the virtual machine has ended. The interrupt control circuit is requested to update an interrupt level in the interrupt control circuit to the newest state. The interrupt level storing circuit saves one or more interrupt levels indicating the priority of the generated interrupt and saves the interrupt level with the highest priority among the saved interrupt levels as a second interrupt mask level. The notified first interrupt mask level is set as an interrupt level in the interrupt level storing circuit. The newly generated interrupt is received, the type of the newly generated interrupt is determined, and an interrupt level corresponding to the determined interrupt type in the interrupt level storing circuit is set. The second interrupt mask level saved in the interrupt level storing circuit is compared with the interrupt level of the newly generated interrupt notified from the second interrupt type determination circuit, and an interrupt to the virtual machine control circuit is notified when the interrupt level of the newly generated interrupt is higher than the second interrupt mask level saved in the interrupt level storing circuit.

Therefore, by updating the priority for masking an interrupt in the interrupt control circuit at a timing at which the interrupt processing of the virtual machine has ended, it is possible to determine the priority of the virtual machine according to the task priority and control adequately the switching of virtual machines even if the virtual machines cannot notify the task priority.

The virtual machine control method according to another aspect of the present invention includes: a first interrupt type determination step of determining a type of an interrupt notified from an interrupt control unit that controls notification of an interrupt on the basis of an interrupt level indicating a priority of the generated interrupt; an interrupt return destination storing step of saving a program counter value immediately preceding the interrupt generation when the generated interrupt is determined to be an interrupt relating to a presently active virtual machine on the basis of the interrupt type determined in the first interrupt type determination step; a first interrupt mask level setting step of notifying to the interrupt control unit a first interrupt mask level corresponding to the next processing to be executed by the virtual machine from among the interrupt mask levels in an interrupt mask level setting table that stores in advance a priority of an interrupt processing executed in each virtual machine and a priority of a task processing executed in each virtual machine as a first interrupt mask level, when the interrupt processing by the virtual machine has ended; an update step of requesting the interrupt control unit to update an interrupt level in the interrupt control unit to the newest state; an interrupt level storing step of that saves one or more interrupt levels indicating the priority of the generated interrupt and saves as a second interrupt mask level in the interrupt level storing unit the interrupt level with the highest priority among the saved interrupt levels; a second interrupt mask level setting step of setting the first interrupt mask level notified in the first interrupt mask level setting step in the interrupt level storing unit as an interrupt level; a second interrupt type determination step of receiving the newly generated interrupt, determining a type of the newly generated interrupt, and setting an interrupt level corresponding to the determined interrupt type in the interrupt level storing unit; and a priority determination step of comparing the second interrupt mask level saved in the interrupt level storing unit with an interrupt level of the newly generated interrupt notified from the second interrupt type determination unit and notifying an interrupt to the virtual machine control unit that controls switching of a plurality of virtual machines operating on a CPU when the interrupt level of the newly generated interrupt is higher than the second interrupt mask level saved in the interrupt level storing unit.

With such a configuration, the virtual machine control unit controls switching of a plurality of virtual machines operating on a CPU, and the interrupt control unit controls notification of an interrupt to the virtual machine control unit on the basis of an interrupt level indicating a priority of the generated interrupt. A type of the interrupt notified from the interrupt control unit is determined and a program counter value immediately preceding the interrupt generation is saved when the generated interrupt is determined to be an interrupt relating to a presently active virtual machine on the basis of the determined interrupt type. The interrupt mask level setting table stores in advance a priority of an interrupt processing executed in each virtual machine and a priority of a task processing executed in each virtual machine as a first interrupt mask level. A first interrupt mask level corresponding to the next processing to be executed by the virtual machine from among the interrupt mask levels in the interrupt mask level setting table is notified to the interrupt control unit when the interrupt processing by the virtual machine has ended. The interrupt control unit is requested to update an interrupt level in the interrupt control unit to the newest state. The interrupt level storing unit saves one or more interrupt levels indicating the priority of the generated interrupt and saves the interrupt level with the highest priority among the saved interrupt levels as a second interrupt mask level. The notified first interrupt mask level is set as an interrupt level in the interrupt level storing unit. The newly generated interrupt is received, the type of the newly generated interrupt is determined, and an interrupt level corresponding to the determined interrupt type in the interrupt level storing unit is set. The second interrupt mask level saved in the interrupt level storing unit is compared with the interrupt level of the newly generated interrupt notified from the second interrupt type determination unit, and an interrupt to the virtual machine control unit is notified when the interrupt level of the newly generated interrupt is higher than the second interrupt mask level saved in the interrupt level storing unit.

Therefore, by updating the priority for masking an interrupt in the interrupt control circuit at a timing at which the interrupt processing of the virtual machine has ended, it is possible to determine the priority of the virtual machine according to the task priority and control adequately the switching of virtual machines even if the virtual machines cannot notify the task priority.

Specific embodiments and examples described in the section Description of Embodiments merely clarify the technical contents of the present invention and are not be considered in a limiting sense because numerous variations are possible within the scope of the claims and without departing from the essence of the present invention.

Industrial Applicability

The virtual machine control device, virtual machine control program, and virtual machine control circuit in accordance with the present invention are effective in information processing devices using virtual machines. Further, the virtual machine control device, virtual machine control program, and virtual machine control circuit in accordance with the present invention can be used in not only configuration such as a large scale computer or a personal computer but also various consumer electronic devices, communication devices inclusive of cellular phones, and embedded devices such as industrial devices and transportation devices.

The invention claimed is:
1. A virtual machine control device comprising:
a virtual machine control unit that controls switching of a plurality of virtual machines operating on a CPU;

a plurality of interrupt controllers that output an interrupt request notifying a generation of an interrupt as one virtual machine from among the plurality of virtual machines performs processing;

an interrupt control unit that receives the interrupt request from the plurality of interrupt controllers and controls notification of the interrupt to the virtual machine control unit on the basis of an interrupt level indicating a priority of the generated interrupt; and an idle detection unit that detects that the CPU has executed a command for implementing a transition to an idle state and outputs the interrupt request to the interrupt control unit, wherein the virtual machine control unit includes:

> a first interrupt type determination unit that determines a type of the interrupt notified from the interrupt control unit;
>
> an interrupt return destination storing unit that stores a program counter value immediately preceding the interrupt generation when the generated interrupt is determined to be an interrupt relating to a presently active virtual machine on the basis of the interrupt type determined by the first interrupt type determination unit;
>
> an interrupt mask level setting table that stores in advance as a first interrupt mask level a priority of an interrupt processing executed in each virtual machine and a priority of a task processing executed in each virtual machine;
>
> a first interrupt mask level setting unit that notifies to the interrupt control unit the first interrupt mask level corresponding to a next processing to be executed by the virtual machine from among the interrupt mask levels in the interrupt mask level setting table when the interrupt processing by the virtual machine has ended, and
>
> an update unit that requests the interrupt control unit to update an interrupt level in the interrupt control unit to the newest state, and the interrupt control unit includes:

> an interrupt level storing unit that stores one or more interrupt levels indicating the priority of the generated interrupt and stores as a second interrupt mask level the interrupt level having the highest priority among the stored interrupt levels;
>
> a second interrupt mask level setting unit that sets in the interrupt level storing unit as an interrupt level the first interrupt mask level notified by the first interrupt mask level setting unit;
>
> an interrupt level setting unit that takes information indicating from where the interrupt request has been notified as an interrupt type and stores an interrupt level corresponding to each interrupt type;
>
> a second interrupt type determination unit that receives a newly generated interrupt request, determines from where, among the plurality of interrupt controllers and the idle detection unit, the newly generated interrupt request has been notified, determines an interrupt type, and sets in the interrupt level storing unit an interrupt level stored in the interrupt level setting unit corresponding to the determined interrupt type, and
>
> a priority determination unit that compares the second interrupt mask level stored in the interrupt level storing unit with the interrupt level of the newly generated interrupt notified from the second interrupt type determination unit, and notifies the interrupt to the virtual machine control unit when the interrupt level of the newly generated interrupt is higher than the second interrupt mask level stored in the interrupt level storing unit;

the virtual machine includes a first virtual machine and a second virtual machine;

the plurality of interrupt controllers include a first interrupt controller corresponding to the first virtual machine, and a second interrupt controller corresponding to the second virtual machine;

the second interrupt controller includes an interrupt level notifying unit that notifies an interrupt level that has been set with respect to each interrupt processed by the second virtual machine at the time of interrupt generation;

the interrupt control unit further includes a notification level reception unit that receives the interrupt level from the interrupt level notifying unit and notifies the received interrupt level to the second interrupt type determination unit;

the second interrupt type determination unit outputs the interrupt level notified by the notification level reception unit to the interrupt level setting unit, and the interrupt level setting unit takes the interrupt level outputted by the second interrupt type determination unit as an interrupt level relating to a notification from the second interrupt controller.

2. The virtual machine control device according to claim 1, wherein the interrupt level storing unit stores the interrupt level of the interrupt received by the second interrupt type determination unit as an interrupt level corresponding to the type of the interrupt that has been stored in advance in the interrupt level setting unit, and further stores as an interrupt level the first interrupt mask level notified from the first interrupt mask level setting unit to the second interrupt mask level setting unit, and the priority determination unit does not notify to the virtual machine control unit an interrupt having a level equal to or less than the interrupt level having the highest priority among the interrupt levels that have been stored in the interrupt level storing unit.

3. The virtual machine control device according to claim 1, wherein the virtual machine control unit further comprises a virtual machine state storing unit that stores operation states of a plurality of virtual machines;

the interrupt control unit further includes an interrupt mask setting unit that sets the priority determination unit so as to mask the generated interrupt request in order not to notify an interrupt request to the virtual machine control unit;

the second interrupt type determination unit updates an operation state of the virtual machine, which has been active immediately before, stored in the virtual machine state storing unit to an idle state when the generated interrupt has been determined to be an interrupt request from the idle detection unit, and the interrupt mask setting unit sets the priority determination unit so as to mask an interrupt request from the idle detection unit and causes the virtual machine control device to implement a transition to the idle state when the operation states of all of the virtual machines are the idle state.

4. The virtual machine control device according to claim 1, further comprising an interrupt level notifying unit that notifies a plurality of interrupt levels that differ according to the type of interrupt to the interrupt control unit, wherein the interrupt control unit further comprises a notification level reception unit that receives the plurality of interrupt levels notified by the interrupt level notifying unit and stores the received plurality of interrupt levels as respective first interrupt mask levels in the interrupt mask level setting table.

5. The virtual machine control device according to claim 1, wherein the virtual machine control unit includes:

an interrupt end detection unit that detects that the interrupt processing by the virtual machine has ended, and an interrupt return destination rewrite unit that saves in the interrupt return destination storing unit an interrupt return destination address designated by the notified interrupt and rewrites the interrupt return destination address in an address of the interrupt end detection unit.

6. The virtual machine control device according to claim 1, further comprising an interrupt negate detection unit that detects that an interrupt request outputted from a peripheral device has been canceled and generates an interrupt to the interrupt control unit.

7. The virtual machine control device according to claim 1, wherein the interrupt level notified by the interrupt level notifying unit includes a first interrupt level and a second interrupt level having a priority lower than that of the first interrupt level;

the first interrupt level and the second interrupt level are lower than an interrupt level that is set when an interrupt request is notified from the first interrupt controller;

the first interrupt mask level corresponding to the first interrupt level stored in the interrupt mask level setting table is higher than the first interrupt mask level that signifies a priority of a task processing of the first virtual machine, and the first interrupt mask level corresponding to the second interrupt level stored in the interrupt mask level setting table is lower than the first interrupt mask level that signifies a priority of a task processing of the first virtual machine.

8. A non-transitory computer readable recording medium storing a virtual machine control program that causes a computer to function as at least:

a virtual machine control unit that controls switching of a plurality of virtual machines operating on a CPU;

a plurality of interrupt controllers that output an interrupt request notifying a generation of an interrupt as one virtual machine from among the plurality of virtual machines performs processing;

an interrupt control unit that receives the interrupt request from the plurality of interrupt controllers and controls notification of the interrupt to the virtual machine control unit on the basis of an interrupt level indicating a priority of the generated interrupt; and an idle detection unit that detects that the CPU has executed a command for implementing a transition to an idle state and outputs the interrupt request to the interrupt control unit, wherein the virtual machine control unit includes:

a first interrupt type determination unit that determines a type of the interrupt notified from the interrupt control unit;

an interrupt return destination storing unit that stores a program counter value immediately preceding the interrupt generation when the generated interrupt is determined to be an interrupt relating to a presently active virtual machine on the basis of the interrupt type determined by the first interrupt type determination unit;

an interrupt mask level setting table that stores in advance as a first interrupt mask level a priority of an interrupt processing executed in each virtual machine and a priority of a task processing executed in each virtual machine;

a first interrupt mask level setting unit that notifies to the interrupt control unit the first interrupt mask level corresponding to a next processing to be executed by the virtual machine from among the interrupt mask levels in the interrupt mask level setting table when the interrupt processing by the virtual machine has ended, and an update unit that requests the interrupt control unit to update the interrupt level in the interrupt control unit to the newest state, and the interrupt control unit includes:

an interrupt level storing unit that stores one or more interrupt levels indicating the priority of the generated interrupt and stores as a second interrupt mask level the interrupt level having the highest priority among the stored interrupt levels;

a second interrupt mask level setting unit that sets in the interrupt level storing unit as an interrupt level the first interrupt mask level notified by the first interrupt mask level setting unit;

an interrupt level setting unit that takes information indicating from where the interrupt request has been notified as an interrupt type and stores an interrupt level corresponding to each interrupt type;

a second interrupt type determination unit that receives the newly generated interrupt request, determines from where, among the plurality of interrupt controllers and the idle detection unit, the newly generated interrupt request has been notified, determines an interrupt type, and sets in the interrupt level storing unit an interrupt level stored in the interrupt level setting unit corresponding to the determined interrupt type, and a priority determination unit that compares the second interrupt mask level stored in the interrupt level storing unit with an interrupt level of the newly generated interrupt notified from the second interrupt type determination unit, and notifies the interrupt to the virtual machine control unit when the interrupt level of the newly generated interrupt is higher than the second interrupt mask level stored in the interrupt level storing unit;

the virtual machine includes a first virtual machine and a second virtual machine;

the plurality of interrupt controllers include a first interrupt controller corresponding to the first virtual machine, and a second interrupt controller corresponding to the second virtual machine;

the second interrupt controller includes an interrupt level notifying unit that notifies an interrupt level that has been set with respect to each interrupt processed by the second virtual machine at the time of interrupt generation;

the interrupt control unit further includes a notification level reception unit that receives the interrupt level from the interrupt level notifying unit and notifies the received interrupt level to the second interrupt type determination unit;

the second interrupt type determination unit outputs the interrupt level notified by the notification level reception unit to the interrupt level setting unit, and the interrupt level setting unit takes the interrupt level outputted by the second interrupt type determination unit as an interrupt level relating to the notification from the second interrupt controller.

9. A virtual machine control circuit comprising:

a virtual machine control circuit that controls switching of a plurality of virtual machines operating on a CPU;

a plurality of interrupt control circuits output an interrupt request notifying a generation of an interrupt as one virtual machine from among the plurality of virtual machines performs processing;

an interrupt control circuit that receives the interrupt request from the plurality of interrupt control circuits and controls notification of the interrupt to the virtual machine control circuit on the basis of an interrupt level indicating a priority of the generated interrupt; and an idle detection circuit that detects that the CPU has executed a command for implementing a transition to an idle state and outputs the interrupt request to the interrupt control circuit, wherein the virtual machine control circuit includes:

a first interrupt type determination circuit that determines a type of the interrupt notified from the interrupt control circuit;

an interrupt return destination storing circuit that stores a program counter value immediately preceding the interrupt generation when the generated interrupt is determined to be an interrupt relating to a presently active virtual machine on the basis of the interrupt type determined by the first interrupt type determination circuit;

an interrupt mask level setting table that stores in advance as a first interrupt mask level a priority of an interrupt processing executed in each virtual machine and a priority of a task processing executed in each virtual machine;

a first interrupt mask level setting circuit that notifies to the interrupt control circuit the first interrupt mask level corresponding to a next processing to be executed by the virtual machine from among the interrupt mask levels in the interrupt mask level setting table when the interrupt processing by the virtual machine has ended, and an update circuit that requests the interrupt control circuit to update the interrupt level in the interrupt control circuit to the newest state, and the interrupt control circuit includes:

an interrupt level storing circuit that stores one or more interrupt levels indicating the priority of the generated interrupt and stores as a second interrupt mask level the interrupt level having the highest priority among the stored interrupt levels;

a second interrupt mask level setting circuit that sets in the interrupt level storing circuit as an interrupt level the first interrupt mask level notified by the first interrupt mask level setting circuit;

an interrupt level setting circuit that takes information indicating from where the interrupt request has been notified as an interrupt type and stores an interrupt level corresponding to each interrupt type;

a second interrupt type determination circuit that receives the newly generated interrupt request, determines from where, among the plurality of interrupt control circuits and the idle detection circuit, the newly generated interrupt request has been notified, determines an interrupt type, and sets in the interrupt level storing circuit an interrupt level stored in the interrupt level setting circuit corresponding to the determined interrupt type, and a priority determination circuit that compares the second interrupt mask level stored in the interrupt level storing circuit with an interrupt level of the newly generated interrupt notified from the second interrupt type determination circuit, and notifies the interrupt to the virtual machine control circuit when the interrupt level of the newly generated interrupt is higher than the second interrupt mask level stored in the interrupt level storing circuit;

the virtual machine includes a first virtual machine and a second virtual machine;

the plurality of interrupt control circuits include a first interrupt control circuit corresponding to the first virtual machine, and a second interrupt control circuit corresponding to the second virtual machine;

the second interrupt control circuit includes an interrupt level notifying circuit that notifies an interrupt level that has been set with respect to each interrupt processed by the second virtual machine at the time of interrupt generation;

the interrupt control circuit further includes a notification level reception circuit that receives the interrupt level from the interrupt level notifying circuit and notifies the received interrupt level to the second interrupt type determination circuit;

the second interrupt type determination circuit outputs the interrupt level notified by the notification level reception circuit to the interrupt level setting circuit, and the interrupt level setting circuit takes the interrupt level outputted by the second interrupt type determination circuit as an interrupt level relating to a notification from the second interrupt control circuit.

* * * * *